(12) United States Patent
Inoue

(10) Patent No.: US 11,341,597 B2
(45) Date of Patent: May 24, 2022

(54) IMAGE PROCESSING METHOD, IMAGE PROCESSING APPARATUS, AND STORAGE MEDIUM

(71) Applicant: CANON KABUSHIKI KAISHA, Tokyo (JP)

(72) Inventor: Yuichi Inoue, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 246 days.

(21) Appl. No.: 16/830,074

(22) Filed: Mar. 25, 2020

(65) Prior Publication Data

US 2020/0311856 A1    Oct. 1, 2020

(30) Foreign Application Priority Data

Mar. 29, 2019    (JP) .............................. JP2019-068040

(51) Int. Cl.
*G06T 1/00*    (2006.01)
*H04N 1/32*    (2006.01)

(52) U.S. Cl.
CPC ....... *G06T 1/0021* (2013.01); *H04N 1/32203* (2013.01); *G06T 2201/0052* (2013.01)

(58) Field of Classification Search
CPC .......... G06T 1/0021; G06T 2201/0052; H04N 1/32203
See application file for complete search history.

(56) References Cited

U.S. PATENT DOCUMENTS

| 9,565,512 | B2 * | 2/2017 | Rhoads | ............... G06F 3/04842 |
| 9,769,380 | B2 * | 9/2017 | Iguchi | .............. H04N 5/232125 |
| 2009/0128858 | A1 * | 5/2009 | Kiuchi | ................. B42D 25/337 |
| | | | | 358/3.28 |
| 2018/0233028 | A1 * | 8/2018 | Rhoads | .................. G08C 17/02 |

FOREIGN PATENT DOCUMENTS

| JP | 2016-63263 A | 4/2016 |
| JP | 2018-207229 A | 12/2018 |

* cited by examiner

*Primary Examiner* — Shefali D Goradia
(74) *Attorney, Agent, or Firm* — Canon U.S.A., Inc. IP Division

(57) ABSTRACT

An image processing method for reading additional information from image data obtained by an imaging device capturing an image of a printed product with the additional information embedded therein as an electronic watermark includes acquiring, a plurality of times, distance information about a distance between the imaging device and the printed product, and causing a display to display a predetermined object in such a manner that a display form of the predetermined object changes according to the acquired distance information.

19 Claims, 21 Drawing Sheets

FIG. 8A

```
01: <svg xmlns= "http://www.w3.org/2000/svg" xmlns:xlink= "http://www.w3.org/1999/xlink"
    width= "300" height= "400" viewBox= "0 0 300 400">
02: <image width= "300" height= "400" x= "0" y= "0" xlink:href= "image.jpg"></image>
03: </svg>
```

FIG. 8B

```
01: <svg xmlns= "http://www.w3.org/2000/svg" xmlns:xlink= "http://www.w3.org/1999/xlink"
    width= "950" height= "1400" viewBox= "0 0 950 1400">
02: <image width= "950" height= "1400" x= "0" y= "0" xlink:href= "image.jpg"></image>
03: </svg>
```

FIG.10

```
01 : <?xml version="1.0" ?>
02 : <content>
03 :    <papersize>89x127mm</papersize>
04 :    <papertype>photographic</papertype>
05 :    <printquality>normal</printquality>
06 :    <imageData>
07 :       <width>950</width>
08 :       <height>1400</height>
09 :       <format>JPEG</format>
10 :       <data>DATA IN JPEG</data>
11 :    </imageData>
12 : </content>
```

FIG.18A
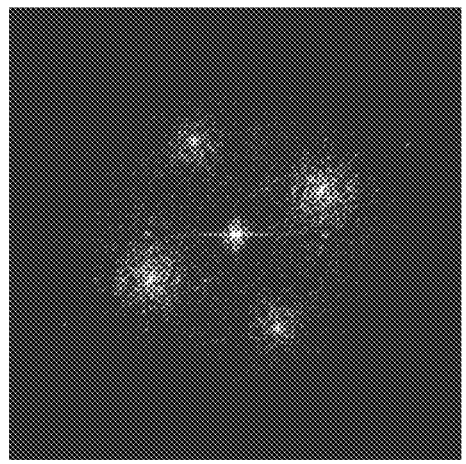
FIG.18B
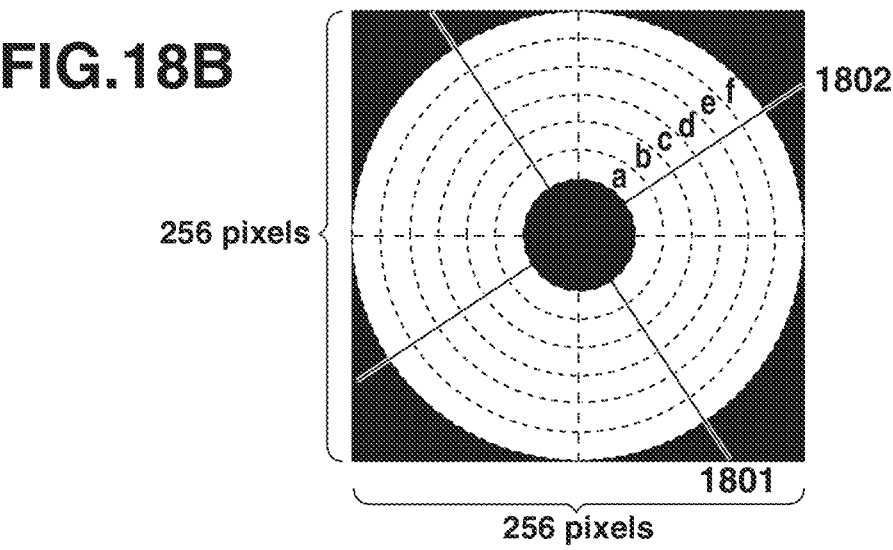
FIG.18C
| Area | Radius | Distance |
|------|--------|----------|
| a | 40 | 1.8 |
| b | 56 | 1.286 |
| c | 72 | 1 |
| d | 88 | 0.818 |
| e | 104 | 0.692 |
| f | 120 | 0.6 |

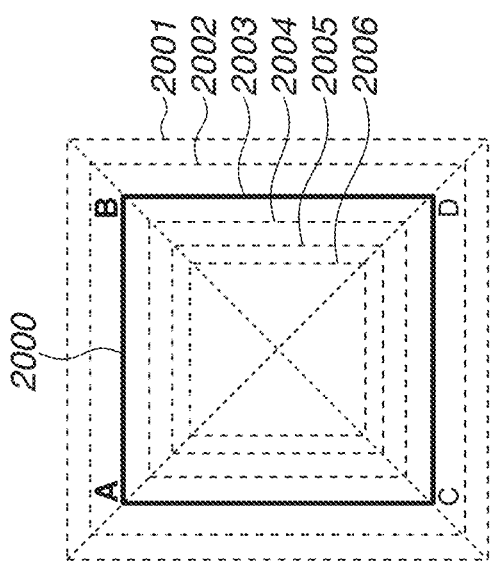
FIG.20A
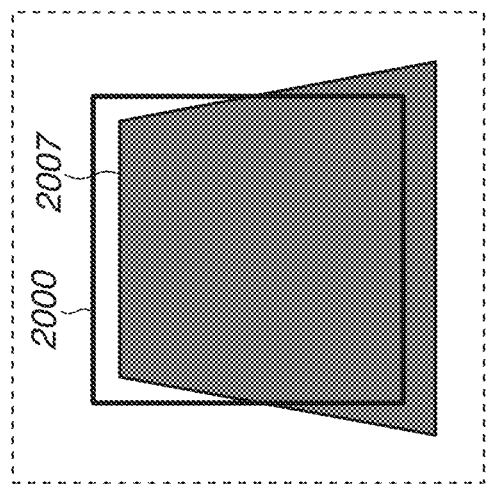
FIG.20B
FIG.20C
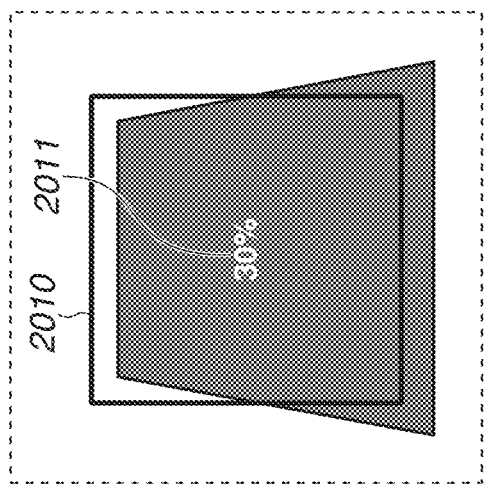
FIG.20D

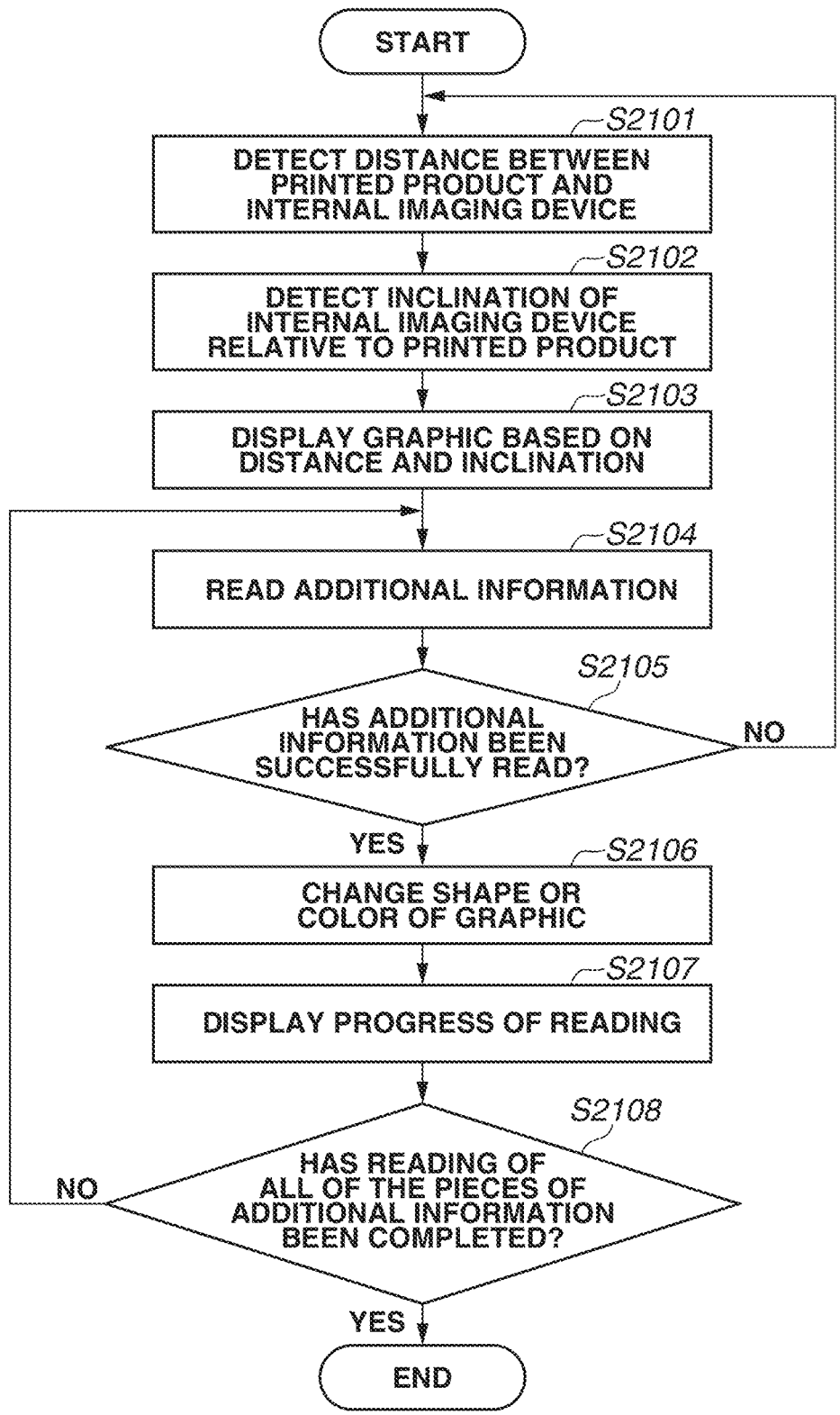

IMAGE PROCESSING METHOD, IMAGE PROCESSING APPARATUS, AND STORAGE MEDIUM

BACKGROUND

Field of the Disclosure

Aspects of the present disclosure generally relate to a technique to read additional information from image data obtained by an imaging device capturing the image of a printed product with the additional information embedded therein as an electronic watermark (digital watermark).

Description of the Related Art

There is a conventional technique called an "electronic watermark (digital watermark)", which embeds, in an image, additional information with a signal that is unlikely to be visually discernible. Then, extracting additional information from an image with the additional information embedded therein can be performed. For example, an image with an additional information embedded therein is printed on a sheet of paper by an image output apparatus, such as a copying machine or a printer, and the additional information is extracted from such a printed product. Examples of such a reading method for additional information include performing data acquisition with use of an application for mobile phones.

Japanese Patent Application Laid-Open No. 2016-63263 discusses a technique to read information by the user capturing, with an imaging device, the image of a printed product with the information embedded therein as an electronic watermark.

To enable the imaging device to be used to read additional information embedded in a printed product as discussed in Japanese Patent Application Laid-Open No. 2016-63263, it is necessary to bring the printed product and the imaging device close to each other at a distance suitable for reading the additional information.

SUMMARY

Aspects of the present invention are generally directed to a technique to enable the user to appropriately set a distance between a printed product and an imaging device when reading information embedded in the printed product as an electronic watermark.

According to an aspect of the present invention, an image processing method for reading additional information from image data obtained by an imaging device capturing an image of a printed product with the additional information embedded therein as an electronic watermark includes acquiring, a plurality of times, distance information about a distance between the imaging device and the printed product during a period in which the image of the printed product is being captured by the imaging device, causing a display to display a first object in such a manner that a size or shape of the first object changes according to pieces of distance information about the distance acquired a plurality of times, reading the additional information from image data obtained by the imaging device capturing the image of the printed product when the distance is a predetermined distance, and further causing the display to display a second object exhibiting a size or shape being a predetermined size or shape of the first object and corresponding to the predetermined distance.

Further features of the present invention will become apparent from the following description of exemplary embodiments with reference to the attached drawings.

BRIEF DESCRIPTION OF THE DRAWINGS

FIGS. 8A and 8B are diagrams illustrating description examples of Scalable Vector Graphics (SVG).

FIG. 10 is a diagram illustrating an example of a print command.

FIGS. 18A, 18B, and 18C are diagrams illustrating an example of calculation of distance information.

FIGS. 20A, 20B, 20C, and 20D are diagrams illustrating display examples of graphics representing a distance and an inclination.

FIG. 21 is a flowchart illustrating processing for reading.

DESCRIPTION OF THE EMBODIMENTS

Various exemplary embodiments, features, and aspects will be described in detail below with reference to the drawings. However, constituent elements set forth in the following exemplary embodiments are merely illustrated as examples and are not intended to limit the scope of the invention to only such constituent elements.

<Outline of Image Processing System>

In an exemplary embodiment of the invention, an image processing apparatus (information processing apparatus) is equipped with an application capable of performing embedding and reading of additional information. The application creates content (image data) with additional information embedded therein. The image processing apparatus generates print data from the created content and transmits the print data to a printer. The printer performs printing using the print data, thus outputting a printed product with the additional information embedded therein.

Then, the above-mentioned image processing apparatus (information processing apparatus) or another apparatus equipped with the above-mentioned application reads, with use of the function of the application, additional information embedded in a printed product from an image obtained by an imaging device capturing the image of the printed product. At that time, the application provides a display for notifying the user of an appropriate distance between the printed product and the imaging device as a guide display for reading additional information.

Furthermore, in the present exemplary embodiment, the term "additional information" refers to information which is embedded into a printed product. The additional information is embedded into (in some cases, added to or multiplexed with) a printed product as an electronic watermark (digital watermark) in a visually inconspicuous manner. The additional information can also be sometimes called "multiplexed information", "watermark information", or "embedded information".

<Hardware Configuration of Image Processing Apparatus>

Figure 1:
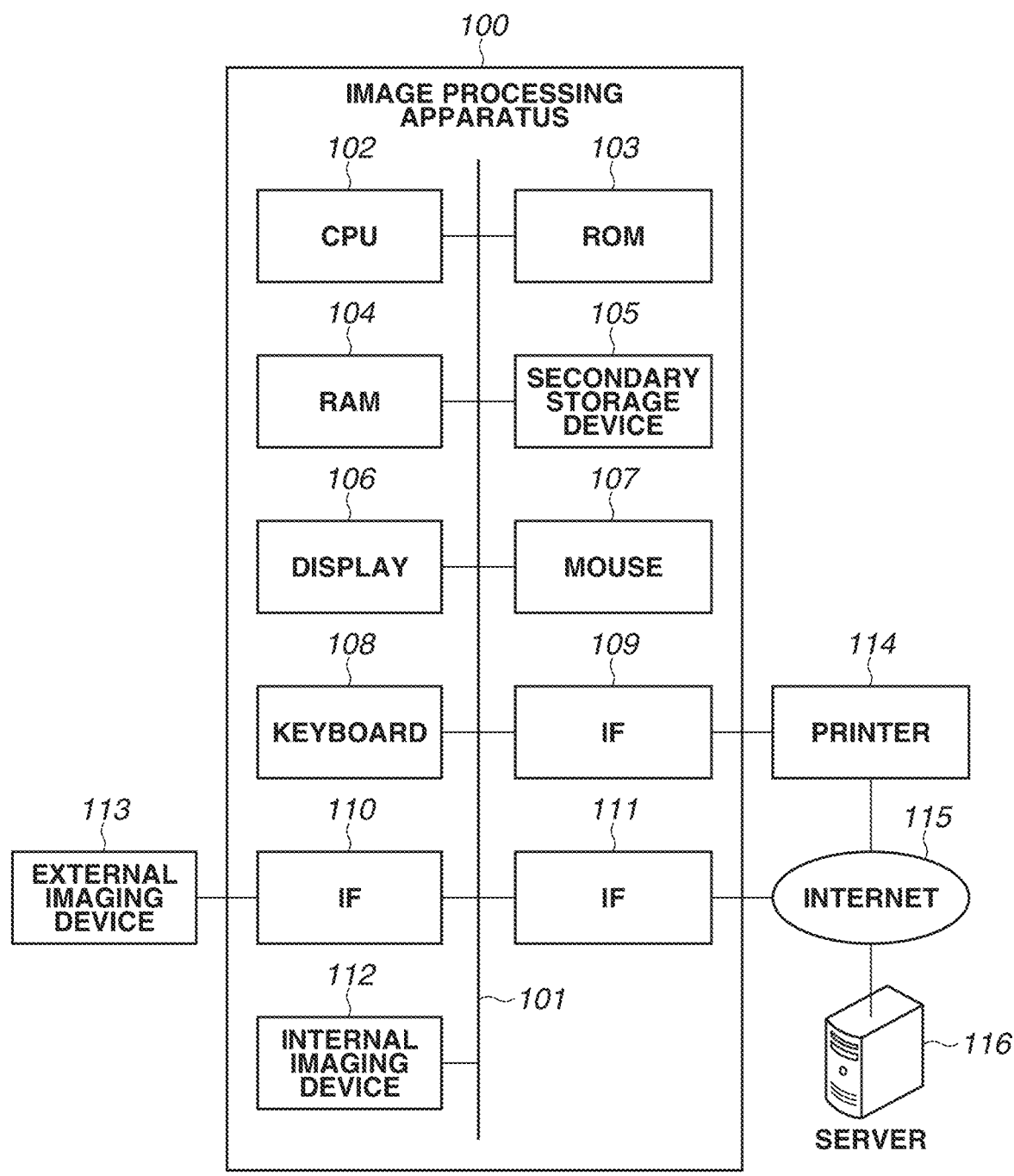
FIG. 1 is a diagram illustrating a hardware configuration example of an image processing system.

FIG. 1 is a diagram illustrating a configuration example of an image processing system according to the present exemplary embodiment. In the image processing system according to the present exemplary embodiment, an image processing apparatus 100 (information processing apparatus) and a printer 114 are interconnected via a network. While, in FIG. 1, a server 116 is also connected to the image processing apparatus 100 and the printer 114 via a network, the server 116 does not necessarily need to be connected.

Examples of the image processing apparatus 100 include an information terminal of the portable type, such as a smartphone, a tablet personal computer (PC), and a notebook PC, and an information terminal of the unportable type, such as a desktop PC. In the following description, in the present exemplary embodiment, a smartphone equipped with a touch display is assumed to be used as the image processing apparatus 100. The image processing apparatus 100 includes a central processing unit (CPU) 102, a read-only memory (ROM) 103, and a random access memory (RAM) 104. Additionally, the image processing apparatus 100 includes a secondary storage device 105, a display 106, a mouse 107, a keyboard 108, an interface (IF) 109, an IF 110, an IF 111, and an internal imaging device 112 serving as an imaging apparatus.

The CPU 102 performs various processing operations, which are described in the following description, according to a program. While, in FIG. 1, a single CPU 102 is illustrated, the CPU 102 can be configured with a plurality of CPUs or CPU cores. The ROM 103 stores a program which is to be executed by the CPU 102. The RAM 104 is a memory which temporarily stores various pieces of information during execution of the program by the CPU 102.

The secondary storage device 105 is a storage medium, such as a hard disk or flash memory. The secondary storage device 105 stores data included in, for example, a database, which retains files and processing results of, for example, image analysis, and various programs. The display 106 displays a user interface (UI) used to receive operations for implementing various processing operations and displays various pieces of information about, for example, results of performed processing operations. The display 106 can be equipped with a touch sensor (not illustrated). The user can input an operation with use of a touch operation such as touch, swipe, or pinch. Furthermore, the display 106 can be equipped with, as a UI, a mouse and a keyboard for inputting, for example, characters.

The internal imaging device 112 performs image capturing. Image data obtained by image capturing is subjected to predetermined image processing and is then stored in the secondary storage device 105. Moreover, image data can be acquired from an external imaging device 113, which is connected to the image processing apparatus 100 via the IF 110, and be then stored in the secondary storage device 105.

The IF 111 is able to perform communication with an external apparatus (for example, the printer 114 or the server 116) via a network such as the Internet 115.

Each of the IFs 109 to 111 is an interface having a communication format of at least one of wired communication and wireless communication and performs communication with an external apparatus according to the communication format used. The image processing apparatus 100 is able to acquire image data from the server 116, which is connected to the Internet 115, or the external imaging device 113 and to output, for example, image data (print data) to the printer 114, via the IFs 109 to 111. Examples of the wired communication include Universal Serial Bus (USB) and Ethernet. Examples of the wireless communication include wireless local area network (LAN), Near Field Communication (NFC), Bluetooth®, and infrared communication.

Various constituent elements included in the image processing apparatus 100 are connected to each other via an internal bus 101, and the CPU 102 controls such various constituent elements via the internal bus 101. Furthermore, in the present exemplary embodiment, the image processing apparatus 100 serves as an execution location (software execution environment) for software such as a program which is executed by the CPU 102 (control unit).

Furthermore, while, in the configuration illustrated in FIG. 1, the printer 114 is described as an example of an external apparatus, the present exemplary embodiment is not limited to this, and the external apparatus can also be another image forming apparatus such as a multifunction peripheral (MFP) or a communication apparatus such as a facsimile (FAX) apparatus.

<Hardware Configuration of Printer>

Figure 2:
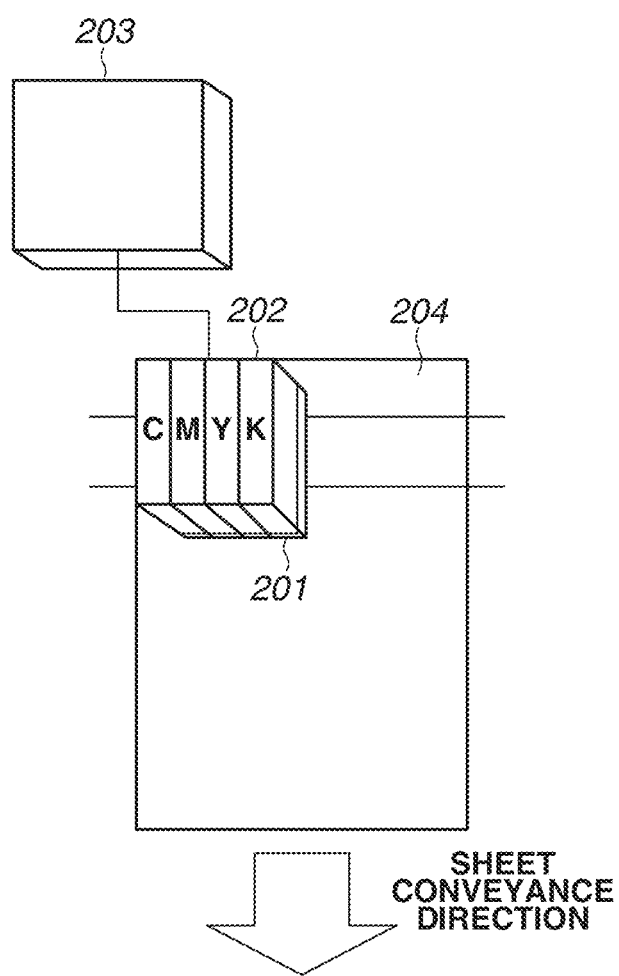
FIG. 2 is a schematic view of a recording head of a printer.

FIG. 2 is a diagram illustrating a part of a hardware configuration of the printer 114. While, in the present exemplary embodiment, the printer 114 of the inkjet type is described as an example, the present exemplary embodiment is not limited to this, and a printer of, for example, the electrophotographic type can be employed.

FIG. 2 illustrates a schematic view of a recording head of the printer 114 in the present exemplary embodiment. The recording head 201 is configured to load ink portions 202, which are filled with inks, thereon. While, in FIG. 2, the ink portions 202 have a configuration for four color inks, any number of color inks can be employed. A control circuit portion 203 includes a storage unit, a calculation unit, and a communication unit which are required to drive the recording head 201. The recording head 201 receives a recording signal and a control signal from the control circuit portion 203 and then performs ejection of ink that is based on the recording signal according to the control signal. A print medium 204, which is a recording medium, is conveyed by a conveyance roller (not illustrated), so that an image is formed on the print medium 204.

Figure 3:
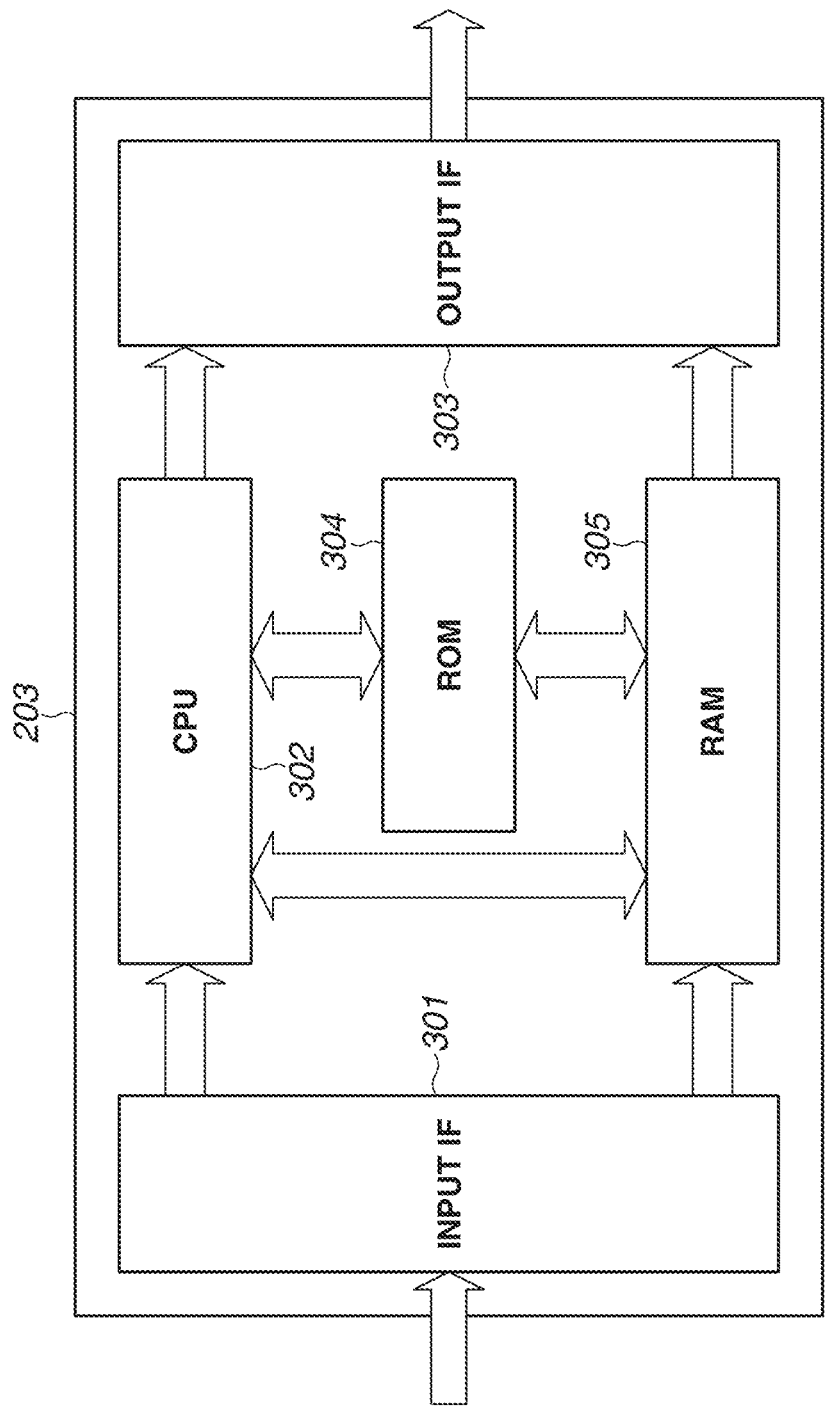
FIG. 3 is a diagram illustrating a configuration example of a control circuit portion of the printer.

FIG. 3 is a block diagram illustrating a configuration of the control circuit portion 203. The control circuit portion 203 includes an input interface (IF) 301, a CPU 302, an output interface (IF) 303, a ROM 304, and a RAM 305. The input interface 301 receives inputting of image data and a control signal for driving the recording head 201 from, for example, an image processing apparatus located outside the printer 114. The input interface 301 sends the image data and the control signal, which have been received, to the RAM 305 and the CPU 302. The CPU 302 executes a control program stored in the ROM 304, which is a non-volatile memory, thus performing signal processing on the image data. The image data subjected to signal processing is output from the output interface 303 as recording data together with the control signal. The recording head 201 is driven by the output recording data and control signal, so that an image is printed on the print medium 204.

<System Configuration>

Figure 4:
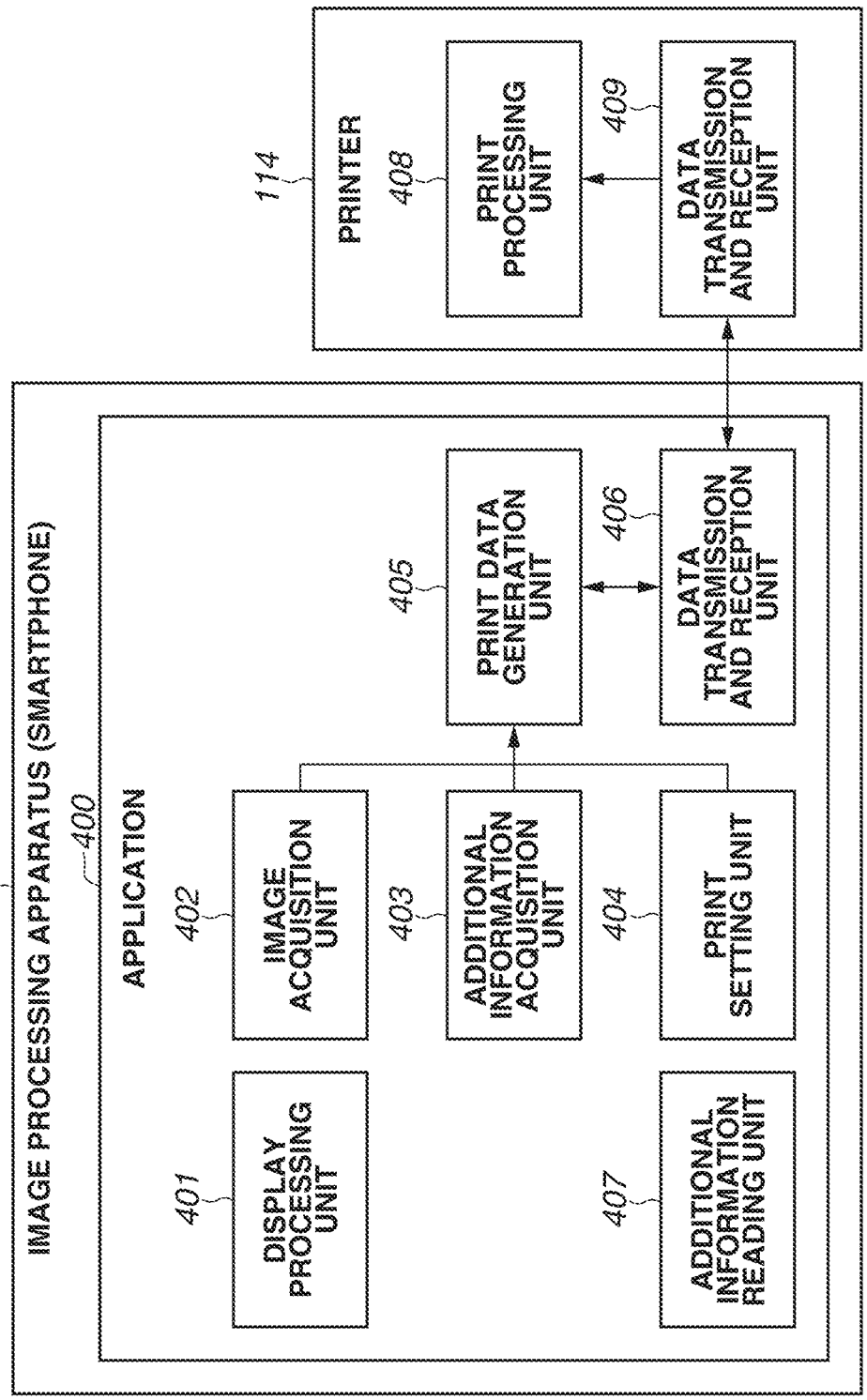
FIG. 4 is a block diagram illustrating a configuration example of the system.

FIG. 4 is a diagram illustrating a configuration example of an image processing system including the image processing apparatus 100, in which an application 400 operates, and the printer 114. Furthermore, when the application 400 is installed on the image processing apparatus 100, a program equivalent to the application 400 is stored in the ROM 103 or the secondary storage device 105. Then, the CPU 102 executes the program on an operating system (OS), thus implementing the function of the application 400 in the present exemplary embodiment.

The application 400 includes a display processing unit 401, an image acquisition unit 402, an additional information acquisition unit 403, a print setting unit 404, a print data generation unit 405, a data transmission and reception unit 406, and an additional information reading unit 407. The above constituent elements 401 to 407 exist in the ROM 103 or the secondary storage device 105 as program modules included in the program stored in the ROM 103. Then, these program modules are executed by the CPU 102, so that the functions provided by the above constituent elements 401 to 407 are implemented. In other words, the CPU 102 functions as the above constituent elements 401 to 407. However, in the present exemplary embodiment, a description is made assuming that each of the constituent elements 401 to 407 is a subject which implements the associated function. Furthermore, the application 400 can include any units besides the above constituent elements 401 to 407.

The application 400 includes the function of generating, based on image data targeted for printing and additional information input, image data with the additional information embedded therein. Then, the application 400 includes the function of transmitting print data for printing the generated image data to the printer 114.

The printer 114 includes a print processing unit 408 and a data transmission and reception unit 409. The print processing unit 408 and the data transmission and reception unit 409 are implemented by the CPU 302 executing the program stored in the ROM 304.

Figure 5:
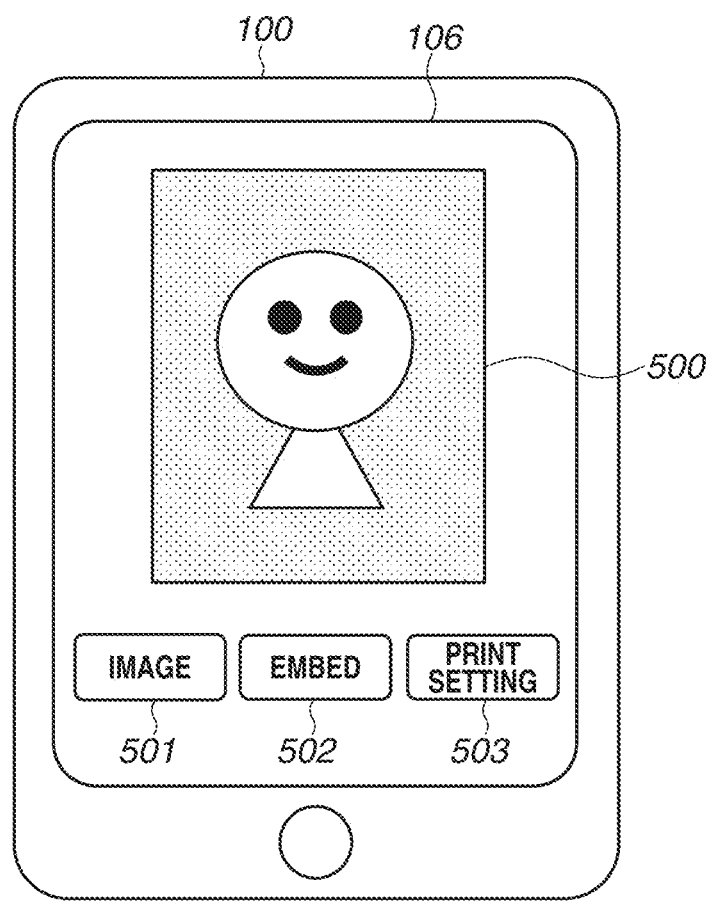
FIG. 5 is a diagram illustrating a screen structure example of an application.

FIG. 5 is a diagram illustrating an example of a screen provided by the application 400, which operates on the image processing apparatus 100. In the following description, processing operations which are performed by the respective blocks illustrated in FIG. 4 are described with reference to the screen example illustrated in FIG. 5.

The display processing unit 401 performs processing for displaying, on the display 106 of the image processing apparatus 100, for example, character information which is to be embedded as additional information and an image which is to be used for print processing. The display processing unit 401 also includes the function of displaying information related to a user interface (UI), such as a button used to select, for example, an image and characters and a list of print setting.

In FIG. 5, an image selection button 501, an embedding information setting button 502, and a print setting button 503 are displayed on the display 106 of the image processing apparatus 100. Content (image) which is being edited is displayed in a content editing area 500.

The image acquisition unit 402 acquires an image which serves as a target in which to embed additional information. For example, when the image selection button 501 illustrated in FIG. 5 is selected, an image selection dialog is opened, thus allowing the user to select an image which is able to be used by the image processing apparatus 100. Furthermore, while, in the present exemplary embodiment, image selection is performed via the image selection dialog, a configuration in which the application 400 starts up the internal imaging device 112 via the OS and then uses an image newly captured by the internal imaging device 112 can be employed. The image acquired by the image acquisition unit 402 is displayed in the content editing area 500 and is able to be enlarged, reduced, rotated, and moved by touch, swipe, and pinch operations. Besides, any optional editing operation can also be performed on the image.

Figure 6:
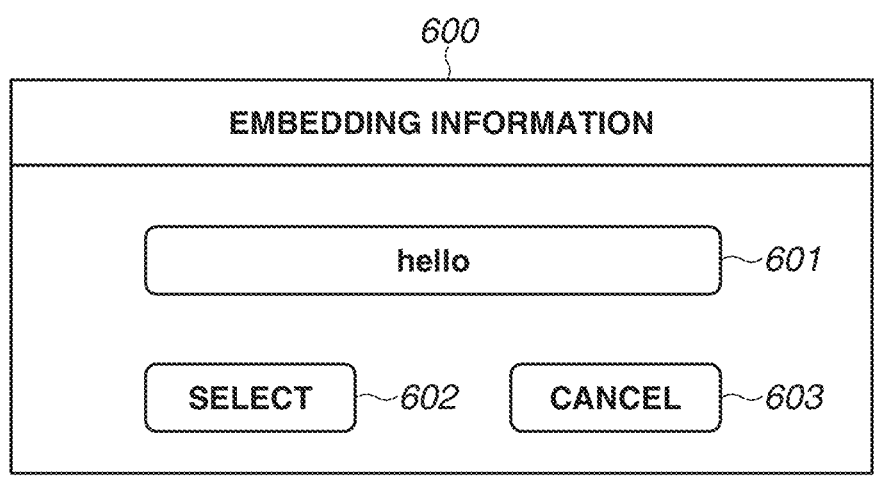
FIG. 6 is a diagram illustrating an example of an embedded information input dialog of the application.

FIG. 6 is a diagram illustrating an example of a dialog 600 for embedding information setting. When the embedding information setting button 502 illustrated in FIG. 5 is selected, the dialog 600 for embedding information setting illustrated in FIG. 6 is displayed on the display 106. The additional information acquisition unit 403 acquires, as additional information, information which has been edited, for example, via the dialog 600 for embedding information setting such as that illustrated in FIG. 6. When the user taps an area 601 illustrated in FIG. 6, the user is allowed to edit information which the user desires to embed as an electronic watermark (additional information). For example, it is assumed that the user desires to embed the character string "hello" as additional information. Furthermore, while, in the present exemplary embodiment, text entry is taken as an example, various pieces of information, such as the copyright, image capturing date and time, image capturing location, and image capturing person concerning an image, can be embedded as additional information. Moreover, information about a hyperlink destination such as Uniform Resource Locator (URL) can also be embedded as additional information. Additionally, information other than text, such as voice or a moving image, can also be embedded as additional information. In a case where there is a shared data table, discrimination information for discriminating data included in the data table can also be embedded as additional information.

When completing inputting of additional information which is to be embedded, the user presses a select button 602, and, when cancelling such inputting, the user presses a cancel button 603. Furthermore, a configuration in which the user consciously inputs additional information which the user desires to embed as described with reference to FIG. 6 or a configuration in which the application 400 inputs additional information with the user being unconscious can be employed.

Figure 7:
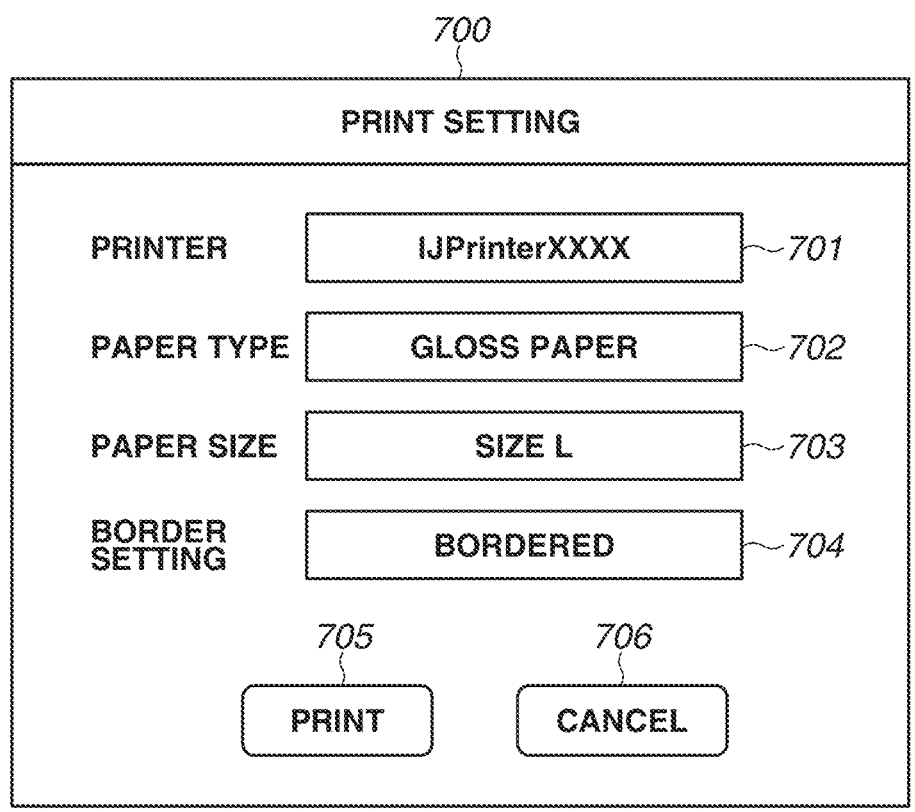
FIG. 7 is a diagram illustrating an example of a print setting dialog of the application.

FIG. 7 is a diagram illustrating an example of a print setting dialog 700. When the print setting button 503 illustrated in FIG. 5 is selected, the print setting dialog 700 illustrated in FIG. 7 is displayed on the display 106. The user performs selection of a printer, selection of a paper type, selection of a paper size, and setting of bordered printing or borderless printing via the print setting dialog 700. When the user taps a printer selection list 701, a list of printers which are available is displayed, so that the user is allowed to select an optional printer. Similarly, when the user taps a paper type list 702, a list of paper types which are available is displayed, so that the user is allowed to select an optional paper type. Examples of the paper types include gloss paper, mat paper, and plain paper. When the user taps a paper size selection list 703, a list of paper sizes which are available in the paper type selected in the paper type list 702, so that the user is allowed to select an optional paper size. In print border setting 704, border setting for printing (bordered printing or borderless printing) is enabled. Bordered printing is a printing method that leaves unprinted margins at the four sides of a printed product, and borderless printing is a printing method that leaves no margins on paper.

When a print button 705 is pressed, the print setting unit 404 transmits a print setting to the print data generation unit 405, so that the application 400 proceeds to a printing process. When a cancel button 706 is pressed, the application 400 returns to a previous screen without performing printing.

Furthermore, information concerning a print setting of the printer which is displayed in the print setting dialog 700 illustrated in FIG. 7 can be previously retained in the information processing apparatus or can be downloaded from the server 116 or the printer 114 via a network as appropriate.

The print data generation unit 405 performs rendering of content, embedding processing of additional information, and generation processing of data required to be printed by the printer 114. In the rendering processing, the print data generation unit 405 generates image data which is used for printing from content acquired by the image acquisition unit 402 and displayed in the content editing area 500 illustrated in FIG. 5. In the additional information embedding processing, the print data generation unit 405 performs processing for embedding additional information acquired by the additional information acquisition unit 403 into image data generated by rendering.

In the present exemplary embodiment, content which is used for generation of print data is described with use of a web standard language, such as HyperText Markup Language (HTML), Cascading Style Sheets (CSS), or JavaScript®. In the present exemplary embodiment, a description is made with an example in which content which is used for printing is described with use of Scalable Vector Graphics (SVG), which is one of graphic expression methods in HTML. However, the present exemplary embodiment is not limited to this, but can use, for example, Canvas, which is used to describe graphics in HTML.

FIGS. 8A and 8B are diagrams illustrating an example in which content which is used for printing is described in the present exemplary embodiment. In the present exemplary embodiment, content in which a single image is located is explained as an example. A description example of SVG in this case is illustrated in FIG. 8A. The description example of SVG illustrated in FIG. 8A is a description used to explain an outline thereof, and a description of detailed settings thereof is omitted. Far-left numerals in FIGS. 8A and 8B represent line numbers.

The first line in FIG. 8A describes content being described in SVG and the size of SVG. The second line is a description concerning an image added to the content. While, in the present exemplary embodiment, the application 400 is described as being configured to create content composed of a single image, a configuration in which a text or stamp is added to such content can be employed. In that case, information about the added text or stamp is described in SVG.

Next, processing in which the print data generation unit 405 performs rendering of SVG content and performs embedding processing (also referred to as multiplexing processing) of additional information, thus generating print data, is described in detail with reference to FIG. 9.

Figure 9:
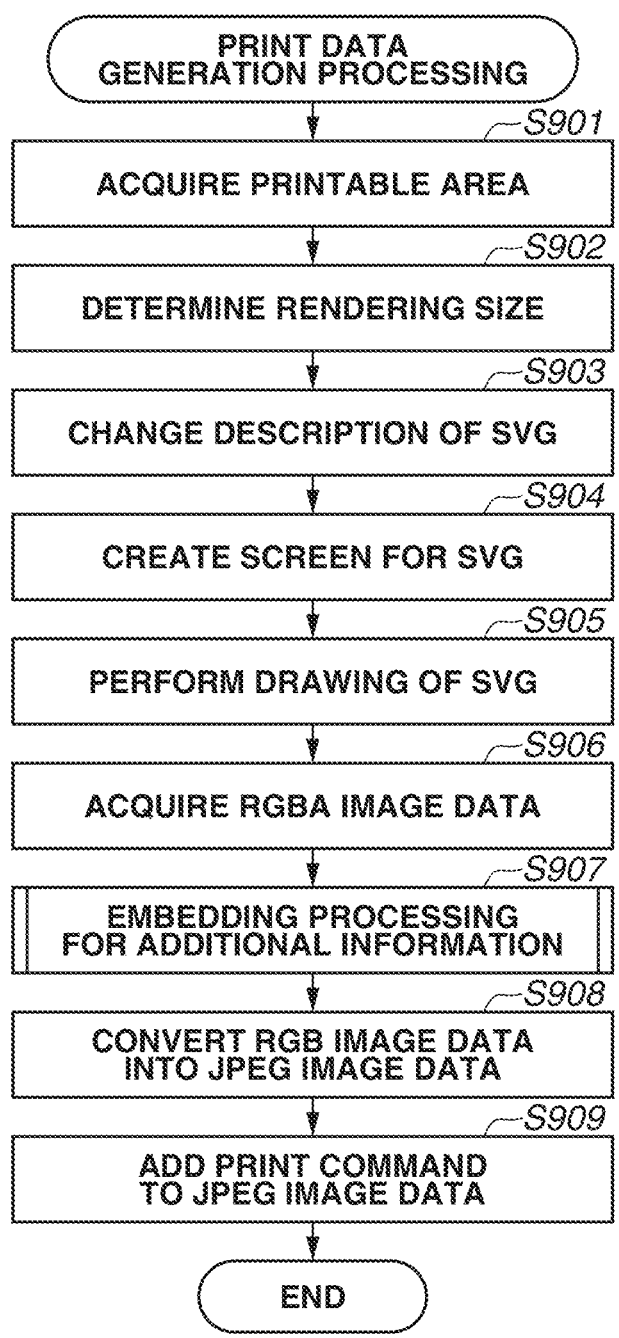
FIG. 9 is a flowchart of print data generation processing.

FIG. 9 is a flowchart illustrating an example of print data generation processing which is performed by the print data generation unit 405.

First, in step S901, the print data generation unit 405 acquires a printable area. In step S902, the print data generation unit 405 determines a rendering size corresponding to the paper setting based on the printable area. In a case where the paper setting includes size L (89 mm×127 mm), bordered printing, and a print resolution of 300 dots per inch (dpi), the rendering size is determined to be 950 pixels (px)×1,400 px. Furthermore, in a case where a print resolution other than 300 dpi is able to be set as the print setting, the print data generation unit 405 determines a rendering size corresponding to such other print resolution. For example, in a case where the above paper setting includes size L, bordered printing, and a print resolution of 600 dpi, the rendering size is determined to be 1,900 px×2,800 px.

In step S903, the print data generation unit 405 rewrites a part of SVG, which is content, for printing. Here, the print data generation unit 405 changes the horizontal width and vertical width of SVG in conformity with the rendering size determined in step S902 into values corresponding to the size of an image which is to be transmitted to the printer. Specifically, "width" and "height" in the second line and third line of SVG illustrated in FIG. 8A are changed to "950" and "1400", respectively, and "viewBox" in the second line therein is changed to "0 0 950 1400". An example of the rewritten SVG is illustrated in FIG. 8B.

Next, in step S904, the print data generation unit 405 requests screen generation from the OS (not illustrated) of the image processing apparatus 100. Here, information about the area of 950 px×1,400 px is acquired with reference to SVG rewritten in step S903. Then, screen generation for SVG (950 px×1,400 px) is performed by the OS. Information about the size of SVG can be retained by not the SVG itself but the application. Moreover, a screen which is generated by the OS is generated as an offscreen image. The offscreen image is a screen which is not displayed by a UI.

In step S905, the print data generation unit 405 requests the OS to perform drawing of SVG on the screen generated in step S904. The OS loads information about SVG. At timing when the information about SVG has been completely loaded, the application 400 receives a notification of load completion from the OS. This notification can be issued by the use of a standard function included in the OS. For example, in the case of Objective-C language, which is used for creation of an iOS application, for example, a webViewDidFinishLoad function corresponds to the load completion notification. Moreover, in the case of Java language, which is used for creation of an Android application, for example, an onPageFinished function corresponds to the load completion notification. Upon receiving the load completion notification, the application 400 determines that drawing of SVG has been completed, and then advances the processing to step S906.

In step S906, the print data generation unit 405 requests image data about content from the OS. The image data requested here is RGBA data about content which is displayed in the offscreen image. In simpler terms, the print data generation unit 405 requests the OS to perform screen capture. In response to a request from the application 400, the OS performs screen capture of the offscreen image obtained by drawing content, and then transmits the acquired RGBA data to the application 400.

In step S907, the print data generation unit 405 performs processing for embedding additional information into the acquired RGBA data. The additional information is embedded into an image in a visually indiscernible manner. In the embedding processing for additional information, additional information acquired by the additional information acquisition unit 403 is used. Details of the embedding processing are described below. The RGBA data acquired from the OS in step S906 contains information about A (Alpha, i.e., transparency or opaqueness). In the present exemplary embodiment, this information about transparency is not used for printing and is, therefore, deleted, so that the embedding processing for additional information is performed with RGB data.

In step S908, the print data generation unit 405 converts the RGB data with additional information added therein into Joint Photographic Experts Group (JPEG) image data. Furthermore, while, in the present exemplary embodiment, an example of converting image data into JPEG is described, a known Portable Document Format (PDF) technique can be used to convert image data into data of the PDF format.

In step S909, the print data generation unit 405 adds a print command, which is to be transmitted to the printer 114, to the JPEG image data generated in step S908. Here, data to be added to the JPEG image data is generated based on information about the print setting. Moreover, if necessary, a command for controlling the printer 114 can be added to the JPEG image data.

FIG. 10 is a diagram illustrating an example of a print command for print data. Here, the print command to be used is a command described in the Extensible Markup Language (XML) format. In, for example, the third to fifth lines illustrated in FIG. 10, a setting for printer indicating "performing printing in the normal mode with respect to gloss paper of the size L" is described. Moreover, in the seventh to ninth lines, print data being "JPEG data with a horizontal width of 950 and a vertical width of 1400" is described, and, in the tenth line, JPEG data obtained by conversion in step S908 is inserted.

Upon receiving image data (JPEG data) as well as a print command such as that described above, the printer 114 performs printing. With the above-described steps, rendering processing, embedding processing for additional information, and generation processing of print data, which are performed by the print data generation unit 405, have been completed.

The description refers back to FIG. 4. The data transmission and reception unit 406 included in the image processing apparatus 100 transmits print data to the printer 114. The application 400 request the OS to transmit the print data, and the OS transmits data received from the application 400 to the printer 114. Transmission of data is performed with use of, for example, a known wireless Wi-Fi technique which connects the image processing apparatus 100 and the printer 114 via wireless radio waves. With regard to a transmission method for data, other known methods can be used. For example, USB ports are used to connect the image processing apparatus 100 and the printer 114. A printer driver included in the image processing apparatus 100 converts print data into raster data which is able to be printed by the printer 114. The image processing apparatus 100 can transmit such printable raster data to the printer 114 via the USB ports. The printer 114 can convert the received raster data into printable data and thus perform printing.

Next, processing which is performed by the printer 114 is described. The data transmission and reception unit 409 included in the printer 114 receives print data transmitted from the image processing apparatus 100. The data transmission and reception unit 409 analyzes a print command included in the received print data, and sends print setting information, such as the analyzed paper size and paper type, to the print processing unit 408. Moreover, the data transmission and reception unit 409 performs decoding processing of a JPEG file included in the print data to convert the JPEG file into image data, and sends the image data obtained by conversion to the print processing unit 408. Here, during normal printing, in a case where correction processing information is included in the print setting information, image correction processing may be performed on image data. Examples of the image correction processing include brightness adjustment, contrast adjustment, and color balance adjustment, and, besides, various processing operations such as backlight correction and red-eye reduction intended for photographic printing. However, in the case of printing an image with additional information embedded therein, since the embedded information may disappear or may be reduced in signal strength due to image processing, such image correction processing is assumed not to be performed. Alternatively, in the present exemplary embodiment, before print data is generated by the application 400 (in other words, before additional information is embedded), image correction processing is performed.

The print processing unit 408 performs color separation of image data received from the data transmission and reception unit 409 into colors suitable to be output by the printer 114, thus converting the image data into ink color data. The method of conversion into ink color data can be any method as long as it is a known color conversion processing method for conversion from an image format for use in image display (RGB) into ink colors for printing (CMYK).

For example, four colors, i.e., cyan (C), magenta (M), yellow (Y), and black (K), are assumed as ink colors for the printer 114. The print processing unit 408 converts input data composed of three colors, i.e., red (R), green (G), and blue (B), into ink color data composed of four colors, i.e., C, M, Y, and K. To perform conversion, the print processing unit 408 uses a color separation table. The color separation table is a three-dimensional look-up table capable of converting three input values of R, G, and B into ink color values of C, M, Y, and K. The print processing unit 408 uses the color separation table for each pixel of the input image data to convert input values of R, G, and B into ink color values of C, M, Y, and K.

The print processing unit 408 further performs image processing, such as output gradation correction and halftoning, with use of image processing parameters of, for example, a look-up table, thus converting ink color data into data for print output.

The data for print output obtained by conversion is sent to the control circuit portion 203 illustrated in FIG. 2. The control circuit portion 203 ejects ink onto the print medium 204 according to the data for print output, thus forming an image on the print medium 204. A printed product formed in this way has additional information embedded therein. With the above-described steps, print processing for print data is ended.

The additional information reading unit 407 of the application 400 has the function of reading and extracting additional information from a printed product with the additional information embedded therein. Details of the extraction processing for additional information are described below. Furthermore, while, in the example illustrated in FIG. 4, a configuration in which the application 400 performs both embedding and reading of additional information is described, embedding and reading of additional information can be separately performed by an application for embedding of additional information and an application for reading of additional information, respectively.

<Embedding Processing for Additional Information>

Figure 11:
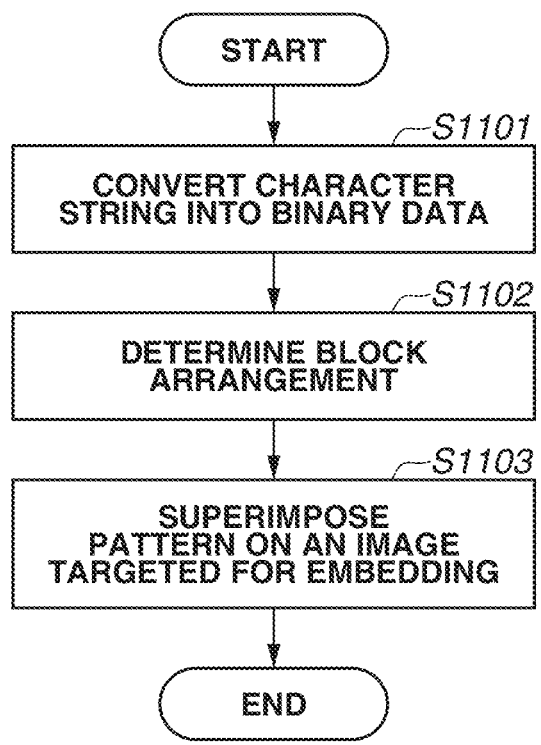
FIG. 11 is a flowchart of embedding processing for additional information.

In the following description, processing for embedding additional information into image data subjected to rendering, which is performed by the application 400, is described. FIG. 11 is a flowchart illustrating embedding processing for additional information, and is a diagram illustrating details of step S907 illustrated in FIG. 9. The processing illustrated in FIG. 11 is performed by the print data generation unit 405 of the application 400.

In step S1101, the print data generation unit 405 converts additional information into binary data. Here, a case where the character string "hello" is input as additional information is described as an example. The binary data is information indicating "0" or "1", and continuous joining of these pieces of information brings about a specific meaning. Correspondences between binary data and characters are defined by what is called "character encoding". For example, in the case of "Shift JIS", which is a character encoding for the Japanese language, "h" corresponds to binary data "01101000". Similarly, "e" corresponds to binary data "01100101", "l" corresponds to binary data "01101100", and "o" corresponds to binary data "01101111".

Thus, the character string "hello" is able to be expressed as "0110100001100101011011000110110001101111" in binary data. Conversely, if binary data "0110100001100101011011000110110001101111" is able to be acquired, the character string "hello" is able to be acquired. In other words, embedding data in such a manner that "0" or "1" is determinable enables implementing embedding of additional information.

Figure 12A:
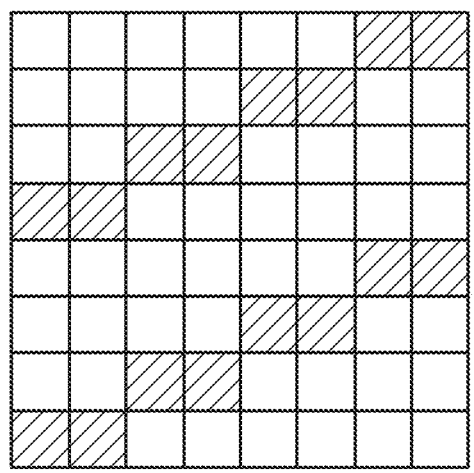
FIGS. 12A, 12B, 12C, and 12D are diagrams illustrating embedding patterns.
Figure 12B:
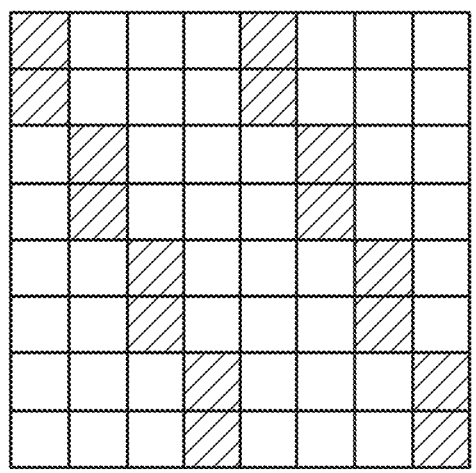

FIGS. 12A, 12B, 12C, and 12D are diagrams used to explain a method of embedding information indicating "0" or "1" into an image. Here, to generate "0" and "1", two patterns illustrated in FIGS. 12A and 12B are considered. For example, the pattern illustrated in FIG. 12A is assumed to represent "0", and the pattern illustrated in FIG. 12B is assumed to represent "1". Each of the patterns illustrated in FIGS. 12A and 12B is composed of 8 px×8 px. One rectangle in each pattern represents one pixel (1 px). The print data generation unit 405 embeds, into an image, additional information which is composed of binary data indicating "0" and "1" according to such patterns. This enables providing a pattern having a periodicity to an area of 8 px×8 px in an image.

Figure 12C:
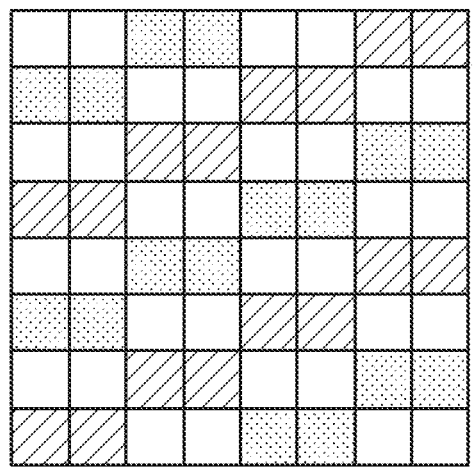
Figure 12D:
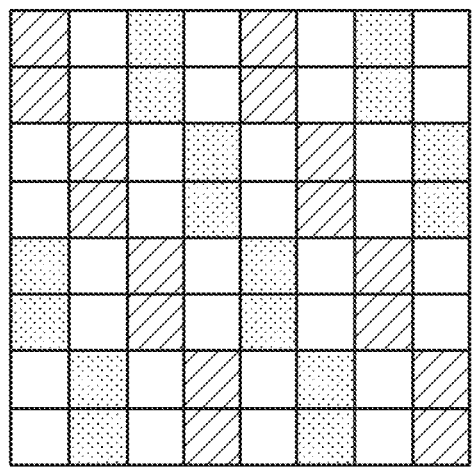

Conceivable methods of embedding a pattern in an image include, for example, a method of directly superimposing a periodicity on R, G, and B values (luminance information). Embedding can be implemented by another method of separating R, G, and B values into another type of color space information (for example, CIE L*a*b* or YCrCb signals), such as luminance—color-difference information, and superimposing a periodicity on such signals. Moreover, embedding can be implemented by a method of separating R, G, and B values into ink colors (for example, CMYK signals) and superimposing a periodicity on such signals. In the present exemplary embodiment, for ease of explanation, a method of superimposing a periodicity on a B component in RGB components is taken as an example. Such a method is assumed to subtract "30" from a B component with respect to each of pixel (px) portions hatched in FIGS. 12A and 12B. It is more favorable to provide not only pixel portions subjected to subtraction but also pixel portions subjected to addition. Forming a pattern in which there are subtraction and addition in equal amount enables reducing a feeling of strangeness which may be brought about by embedding of additional information in an image. Each of FIGS. 12C and 12D illustrates a pattern which contains subtraction and addition. Each halftone dot pattern portion in FIGS. 12C and 12D is a portion subjected to addition. In this way, embedding of additional information is performed by processing the value of a predetermined component along a predetermined pattern out of RGB data of an image targeted for embedding additional information therein. Furthermore, while, in the present exemplary embodiment, a method of directly embedding a periodic pattern into an original image is employed, another method can also be employed. For example, a configuration which, after embedding signals into portions corresponding to the frequency of a pattern in a frequency space, adds or subtracts an image obtained by Fourier inverse transform to or from an original image can be employed. Alternatively, a configuration which, after once converting the whole or a part of an image into a frequency space by Fourier transform and embedding signals into portions corresponding to the frequency of a pattern, sets an image obtained by Fourier inverse transform as an embedded image can be employed.

Figure 13:
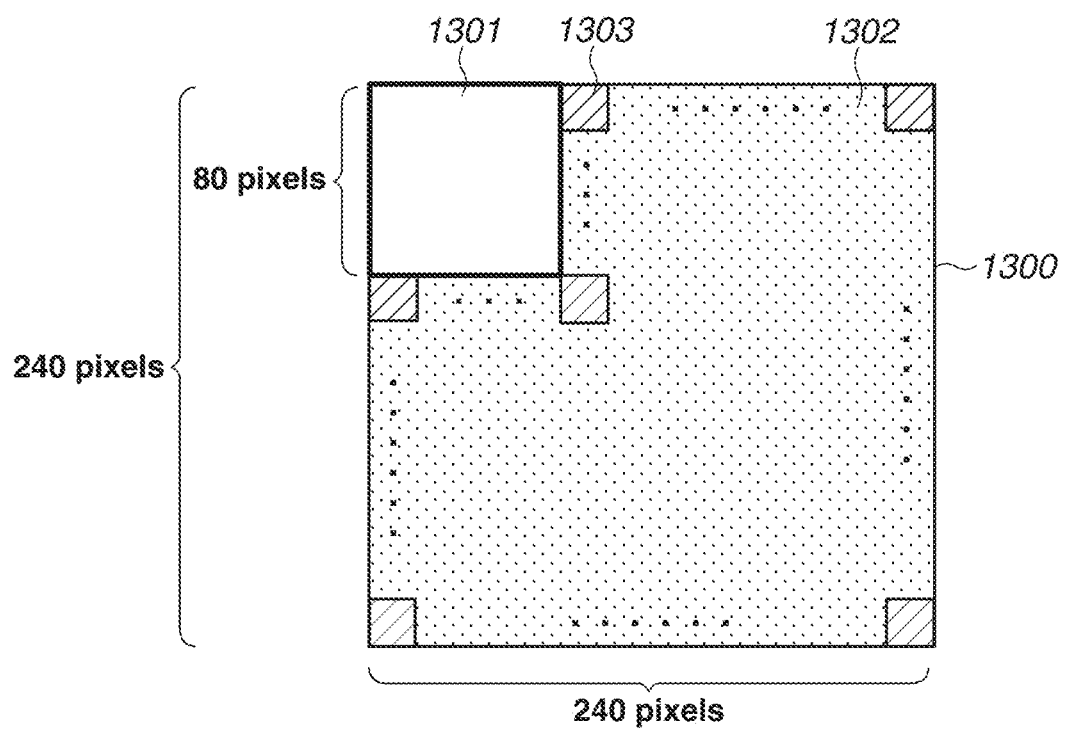
FIG. 13 is a diagram illustrating a configuration example of a unit block.

FIG. 13 is a diagram illustrating a unit block (a multiplexing block) for additional information, which is used in the present exemplary embodiment. A block 1300 represents one unit block, and reading out all of the pieces of information from within the unit block enables extracting embedded additional information. The unit block 1300 is composed of a marker portion 1301 and a data portion 1302. The marker portion 1301 is a block of 80 pixels×80 pixels which is used to specify the position of the unit block 1300 during reading of additional information, and has information indicating a marker portion embedded therein. The information indicating the marker portion 1301 is, for example, a specific pattern composed of a combination of both of the patterns illustrated in FIGS. 12A and 12B and added to the marker portion 1301, and detecting the specific pattern during reading enables detecting the marker portion 1301. As another method, it is conceivable that the marker portion 1301 is composed of a pattern having a periodicity or periodic direction different from those illustrated in FIGS. 12A and 12B.

The data portion 1302 is lined with patterns 1303, each of which corresponds to the pattern illustrated in FIG. 12A or 12B (i.e., a pattern indicating "0" or "1"). The unit block 1300 in the present exemplary embodiment is composed of 240 pixels×240 pixels, and the data portion 1302 contains 800 patterns 1303. Since one pattern 1303 is able to represent one-bit information, the entire block 1300 has an amount of information equivalent to 800 bits.

Furthermore, in the present exemplary embodiment, the marker portion 1301 in each unit block is located at the upper left corner of the block 1300, but can be located at another position, such as the upper right corner or the center of the block 1300. Moreover, the marker portion 1301 can be of the shape other than a rectangle or can be located while being dispersed in each unit block.

Figure 14:
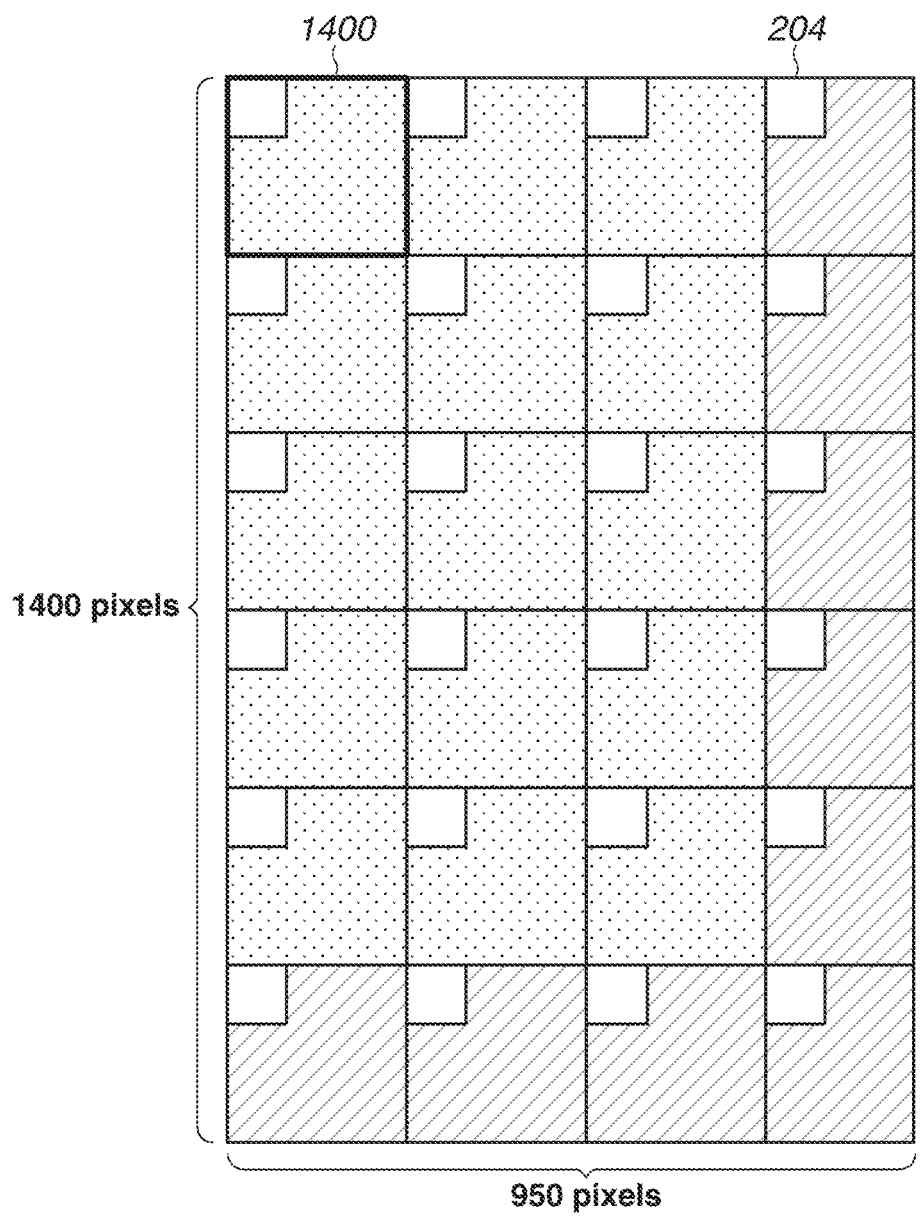
FIG. 14 is a diagram illustrating an example of unit block embedding into a printed product.

FIG. 14 is a diagram illustrating a manner in which unit blocks 1300 (unit blocks 1400 in FIG. 14) are repetitively embedded in the print medium 204. Specifically, FIG. 14 illustrates a manner in which unit blocks 1300 representing the same additional information are repetitively embedded in the whole surface of the print medium 204. The print setting for the print medium 204 illustrated in FIG. 14 is assumed to be size L, 300 dpi printing, and bordered printing. Due to the processing performed in step S902, the print image size in this case is 950 px in horizontal width (width)×1,400 px in vertical width (height). Since the print image size is 950 px×1,400 px, the print medium 204 is able to be lined with 3×5=15 unit blocks 1400 each of 240 px×240 px. To read out additional information embedded in the print medium 204, it only needs to be possible to read a data portion of at least one of a plurality of unit blocks 1300 repetitively embedded in the above manner. Furthermore, embedding the same information (unit block 1300) in many portions of the whole surface of the print medium 204 enables increasing the robustness in reading. This is because, while it is impossible to read out additional information from a unit block 1300, it may become possible to read out additional information by referring to another unit block 1300. Furthermore, while, in the present exemplary embodiment, the case of repetitively embedding the same information (unit block 1300) is taken as an example, the present exemplary embodiment is not limited to this example. The case of embedding different pieces of information (blocks having different contents) in the whole surface of an image can be employed. While, in FIG. 14, there are areas having insufficient block sizes at the right-hand portion and lower portion of the print medium 204, a part of the block is embedded in each of such areas.

The description refers back to the flowchart of the embedding processing for additional information illustrated in FIG. 11. When binarization of the additional information (character string) is completed, the print data generation unit 405 advances the processing to step S1102.

In step S1102, the print data generation unit 405 determines the arrangement of unit blocks. The print data generation unit 405 lines the print image with unit blocks with the upper left corner of the print image set as the starting point. FIG. 14 illustrates an example in which the print image is lined with unit blocks with the upper left corner of the print image set as the starting point.

In step S1103, the print data generation unit 405 performs embedding of the additional information in an image with the determined block arrangement. Embedding of the additional information is performed by superimposing the pattern illustrated in any one of FIGS. 12A and 12B on each pixel while associating a target image and the block arrangement illustrated in FIG. 14 with each other. Specifically, since a data portion in each block illustrated in FIG. 14 is composed of the patterns each illustrated in FIG. 12A or the patterns each illustrated in FIG. 12B, an operation of subtracting "30" from the B value of RGB values of a pixel corresponding to a hatched portion of each pattern is performed. In a case where the B value falls below "0", the value used for subtraction from the B value is set to "0". When such an operation is applied to the entire image, embedding of the additional information in an image is completed.

In the above description, processing for embedding additional information into an image and then performing printing of the image with a printer has been described with reference to the block diagrams. Next, processing for reading a printed product with additional information embedded therein is described.

<Reading Processing for Additional Information>

Reading processing for additional information is performed by the additional information reading unit 407 of the application 400 illustrated in FIG. 4, but can be performed by an application included in a device other than the device which has performed embedding.

Figure 15:
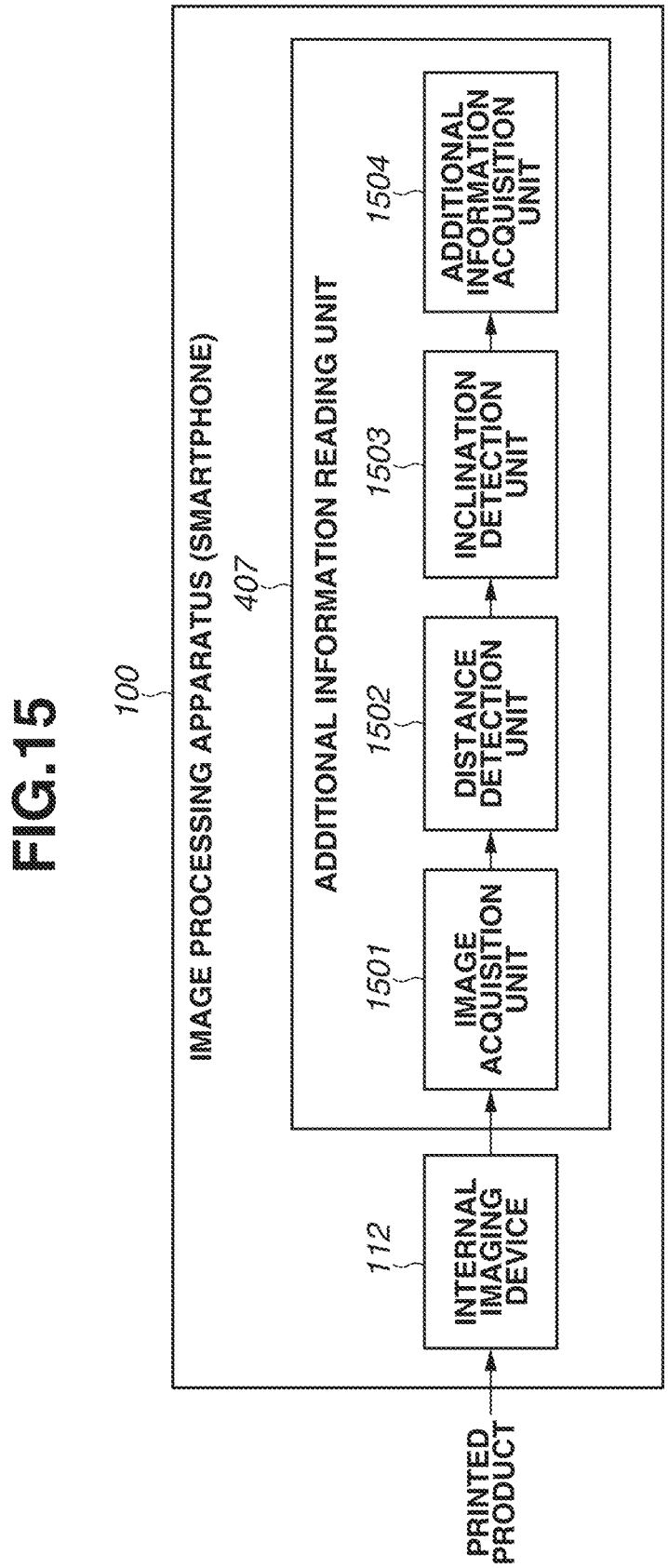
FIG. 15 is a block diagram of an information processing apparatus including an additional information reading unit.

FIG. 15 is a block diagram related to the reading processing for additional information. The additional information reading unit 407 included in the application 400 of the image processing apparatus 100 includes an image acquisition unit 1501, a distance detection unit 1502, an inclination detection unit 1503, and an additional information acquisition unit 1504.

Figure 16:
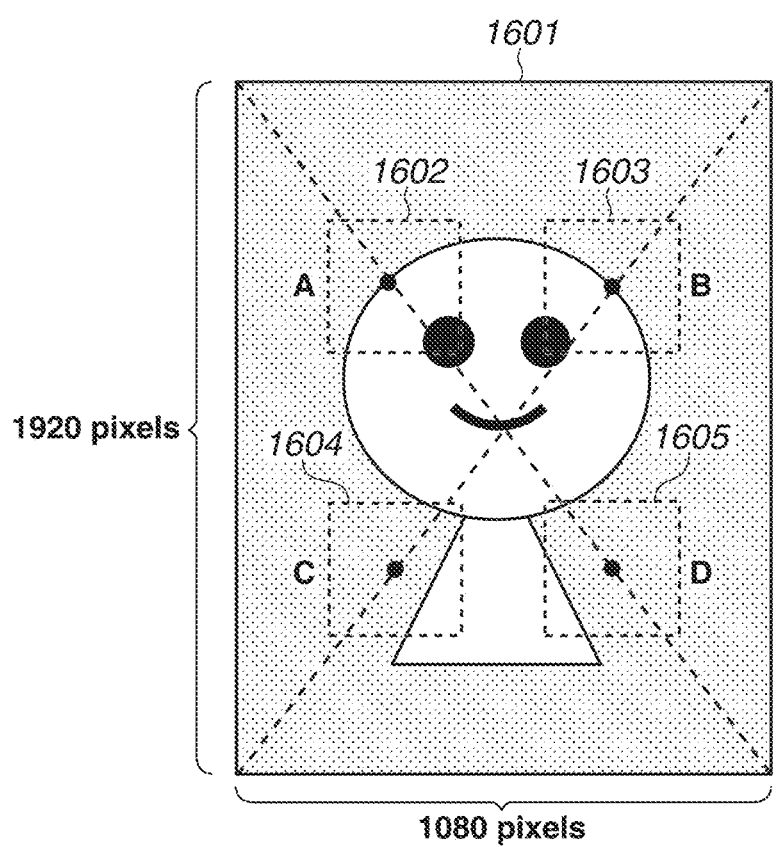
FIG. 16 is a diagram illustrating examples of a captured image and cropping for distance detection during reading.

First, the image acquisition unit 1501 controls the internal imaging device 112 to perform image capturing of a printed product with additional information embedded therein, thus acquiring image data. The image data acquired by image capturing can be data about a still image, or can be data about a still image extracted from each frame of a moving image. The image data acquired by image capturing is sent to the distance detection unit 1502. The image data is assumed to be obtained as 8-bit data of the RGB format. Moreover, the size of the image data is assumed to be 1,080 pixels×1,920 pixels (2K size). FIG. 16 illustrates an example of image data obtained by image capturing.

Figure 17:
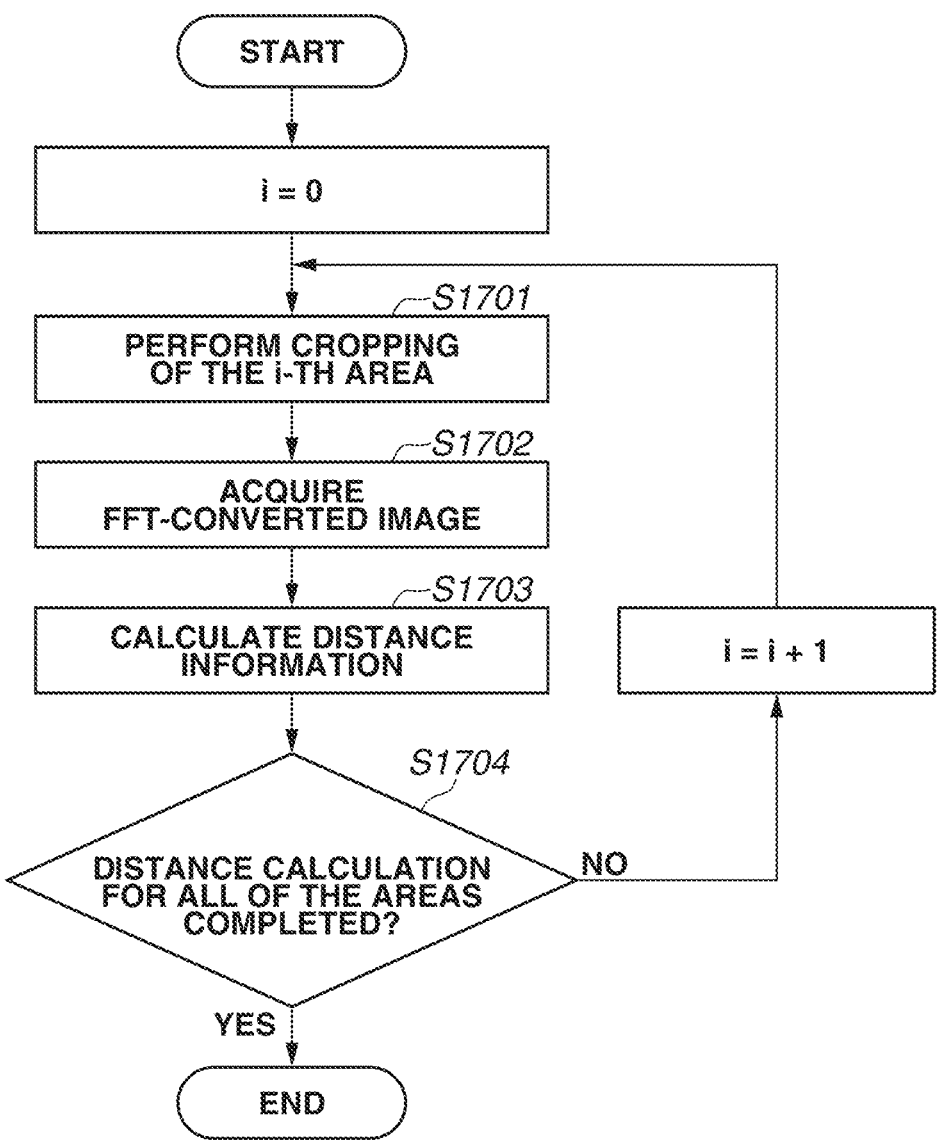
FIG. 17 is a flowchart of calculation processing for distance information.

The distance detection unit 1502 performs frequency analysis of a plurality of areas within image data 1601 illustrated in FIG. 16 and thus calculates information about a distance for each area. The information about a distance is information about a relative distance between a terminal (image processing apparatus 100) and a printed product. FIG. 17 illustrates a flow of the distance information calculation. Furthermore, the processing illustrated in the flowchart of FIG. 17 is started based on the user having started an instruction for a reading mode in the application 400. Moreover, along with starting of the reading mode, the application 400 activates the internal imaging device 112 via the OS, so that the image acquisition unit 1501 acquires an image. Furthermore, in the application 400, until the reading mode is ended by, for example, an instruction from the user, the acquisition of an image by the image acquisition unit 1501 and the processing illustrated in FIG. 17 performed by the distance detection unit 1502 are repeated.

First, in step S1701, the distance detection unit 1502 performs cropping processing. The distance detection unit 1502 sets partial areas 1602 to 1605 of the image data illustrated in FIG. 16 as cropping areas, and clips each of the cropping areas 1602 to 1605 with a size of 256 pixels×256 pixels. In the following description, the cropping areas 1602 to 1605 are referred to as an "area A", an "area B", an "area C", and an "area D", respectively. The position of clipping is assumed to be such a position that the center of each cropping area coincides with a point on a straight line connecting the center of the image data 1601 and a vertex of the rectangle. In the present exemplary embodiment, the distance detection unit 1502 performs clipping in a state in which the center of each cropping area is located just in the middle between the center of an image equivalent to a printed product and a vertex of the image. If the position of cropping is a position close to a vertex of the image, when image capturing is performed from a position away from the printed product (in a zoom-out state), it may be impossible to perform calculation of distance information described below. This is because, to calculate distance information in a cropping area, a part of the printed product is required to be included in the area. On the other hand, if the position of cropping is a position close to the center of the image, a difference becomes unlikely to occur between results of calculation of distance information for the respective areas. Therefore, it is favorable to perform cropping near the middle between the center of an image and a vertex of the image. Furthermore, while, in the present exemplary embodiment, cropping is performed with a size of 256 pixels×256 pixels, this size does not need to be employed. However, to perform processing for conversion into a spatial frequency domain, it is desirable that cropping be performed with a size of a power of 2. For example, the size can be 128 pixels×128 pixels or can be 512 pixels×512 pixels.

Next, in step S1702, the distance detection unit 1502 acquires an image obtained by converting the cropped image obtained in step S1701 into a spatial frequency domain. In the present exemplary embodiment, the distance detection unit 1502 uses two-dimensional fast Fourier transform (FFT). A known technique is used for an algorithm of FFT. FIG. 18A illustrates an example of an FFT image obtained by converting a part of actually captured image data into a spatial frequency domain. When the center of the image is set as an origin, the horizontal axis indicates a frequency in the horizontal direction and the vertical axis indicates a frequency in the vertical direction, and, as a point is further away from the origin, the point is in a higher-frequency area.

Next, in step S1703, the distance detection unit 1502 calculates a distance between the internal imaging device 112 and the printed product with use of the FFT image acquired in step S1702, thus acquiring distance information about the calculated distance. The image data obtained by performing image capturing of the printed product illustrated in FIG. 16 contains a numerous number of two types of patterns illustrated in FIGS. 12A and 12B, which are embedded in the printed product. Therefore, converting an image obtained by cropping a part of the captured image data into a spatial frequency domain causes large power spectra to occur in portions corresponding to the directions of waves and the frequencies of the two types of patterns. Since, in the FFT image, the same peak also occurs at 180-degree rotationally symmetric portions, peaks are caused to occur at four points in the spatial frequency domain. In FIG. 18A, it can be seen that peaks are occurring at four points.

FIG. 18B illustrates an example of an operation of detecting a distance based on the FFT image. In a case where an inclination (rotation) is not occurring between an imaging device and a printed product, peaks corresponding to the patterns illustrated in FIGS. 12A and 12B occur on a line 1801 and a line 1802 illustrated in FIG. 18B. However, the frequency in which a peak occurs varies according to a distance between the imaging device and the printed product. For example, in a case where the distance is short, a peak occurs at the low frequency side, and, in a case where the distance is long, a peak occurs at the high frequency side. In FIG. 18B, except for a low frequency region near the center, six ring-shaped areas "a" to "f" are set in order from the low frequency side. The distance detection unit 1502 calculates a distance D between the imaging device and the printed product by determining in which of the areas "a" to "f" the peak is included. Examples of the method of determining an area include a method of obtaining the maximum value of pixels included in each area and determining that a peak exists in an area in which the maximum value is the largest. Moreover, the distance detection unit 1502 can obtain an average value of pixels included in each area and determine that a peak exists in an area in which the average value is the largest.

Examples of the formula for calculating the distance D include the following formula (1).

$$D = \frac{r}{32\sqrt{5}} \quad (1)$$

In formula (1), "r" denotes the radius of a ring-shaped area. The radius as used herein is the middle radius between the outer circumference radius and the inner circumference radius of the ring-shaped area. Column "Radius" illustrated in FIG. 18C indicates the value of the radius "r" of each area. According to formula (1), a relative distance obtained by converting, as "1", a distance obtained in a case where patterns of 8 pixels×8 pixels illustrated in FIGS. 12A and 12B are included in 256 pixels×256 pixels in the same size is obtained. More specifically, since the patterns illustrated in FIGS. 12A and 12B are included in 256 pixels×256 pixels for 64×√5/2 cycles, the relative distance can be obtained by dividing the radius "r" (equivalent to a frequency) by this frequency. Column "Distance" illustrated in FIG. 18C indicates the value of a distance for each area.

Furthermore, while, in the present exemplary embodiment, the relative distance is calculated with the distance obtained by same-size image capturing set as "1", since it is known that the radius "r" in a frequency domain is equivalent to a distance between the imaging device and the printed product, the radius "r" can be directly used as a value equivalent to the distance. Moreover, while, in the present exemplary embodiment, the number of ring-shaped areas is set to 6, the number of ring-shaped areas can be increased or decreased.

Finally, in step S1704, the distance detection unit 1502 determines whether the distance calculation has been completed with respect to all of the cropping areas A to D. If it is determined that the distance calculation has not yet been completed (NO in step S1704), the distance detection unit 1502 re-performs processing starting with step S1701 to calculate a distance for another area. If it is determined that the distance calculation has been completed with respect to all of the cropping areas (YES in step S1704), the distance detection unit 1502 sends information about the distances to the inclination detection unit 1503.

Figure 19E:
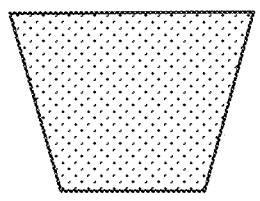
FIGS. 19A, 19B, 19C, 19D, 19E, 19F, 19G, 19H, and 19I are diagrams illustrating states of inclinations.
Figure 19I:
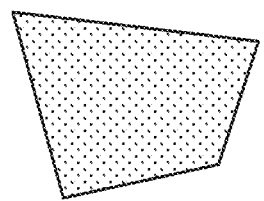
Figure 19D:
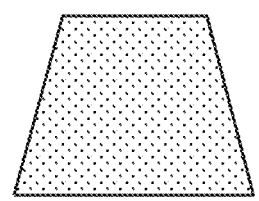
Figure 19H:
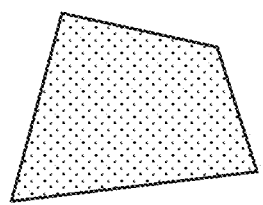
Figure 19C:
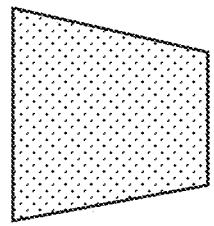
Figure 19G:
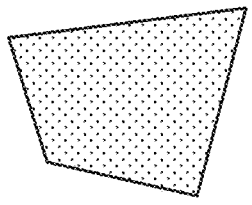
Figure 19B:
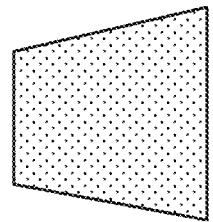
Figure 19F:
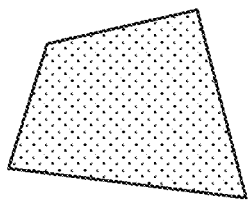
Figure 19A:
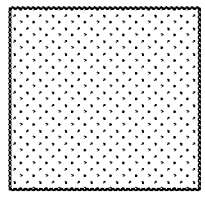

The inclination detection unit 1503 detects an inclination between the imaging device and the printed product based on the distance information calculated by the distance detection unit 1502. Here, states of the inclination are described with reference to FIGS. 19A, 19B, 19C, 19D, 19E, 19F, 19G, 19H, and 19I. FIG. 19A illustrates a state of the printed product the image of which is captured when no inclination is occurring. While, actually, the image of the whole of a printed product is not always captured and only a part of the image may be captured, here, for ease of explanation, the image of the whole printed product is assumed to be captured. If the inclination occurs, the shape of the captured image of the printed product changes to any one of the states illustrated in FIGS. 19B to 19I. However, it is not known from the actually captured image in which state the inclination is. Therefore, the inclination detection unit 1503 detects the state of the inclination from pieces of distance information about four cropping areas A to D acquired by the distance detection unit 1502. More specifically, the inclination detection unit 1503 is able to recognize which of the states illustrated in FIGS. 19B to 19I the state of the inclination is by obtaining a difference in distance based on the respective pieces of distance information about the cropping areas A to D. For example, if, while the distances about the cropping areas A and B are in the same range and the distances about the cropping areas C and D are in the same range, the distances about the cropping areas C and D are shorter than the distances about the cropping areas A and B, the inclination detection unit 1503 determines that the printed product is inclined into the state illustrated in FIG. 19B relative to the imaging device.

The distance and inclination detected in the above-described way are displayed on the display 106 by the display processing unit 401. In the present exemplary embodiment, an example in which the states of distance and inclination are displayed with a quadrangle is described. FIGS. 20A, 20B, 20C, and 20D are diagrams illustrating the manners in which the shape of a quadrangle is displayed on the display 106. Furthermore, each of displaying manners illustrated in FIGS. 20B to 20D is displayed on the display 106 while being superimposed on, for example, an image (for example, the image of a printed product) which the internal imaging device 112 is capturing at that time.

A thick-line rectangle 2000 illustrated in FIG. 20A represents a distance and an inclination which are appropriate for reading of additional information. On the other hand, dashed lines 2001 to 2006 represent rectangles obtained by enlarging or reducing the rectangle 2000. These rectangles respectively correspond to the ring-shaped areas "a" to "f" for use in distance calculation, and the relative distances from the center to a vertex respectively correspond to the distances illustrated in FIG. 18C. The ring-shaped area "c" is "1" in distance value and, therefore, coincides with the thick-line rectangle 2000.

As an example, a case where the results of distance calculation in the cropping areas A, B, C, and D are 0.818, 0.818, 1.286, and 1.286, respectively, is described. In this case, a quadrangle 2007 of the shape illustrated in FIG. 20B is displayed.

Furthermore, as mentioned above, in the application 400, until the reading mode is ended by, for example, an instruction from the user, the acquisition of an image by the image acquisition unit 1501 and the processing illustrated in FIG. 17 performed by the distance detection unit 1502 are repeated. Additionally, displaying performed by the display processing unit 401 illustrated in each of FIGS. 20A to 20D is also repetitively performed until the reading mode is ended. Therefore, the quadrangle 2007 changes in shape as appropriate according to results of the detection of distance and inclination which is performed in real time. Therefore, the user is enabled to bring the distance and the inclination close to a distance and an inclination which are appropriate for reading of additional information, by adjusting a relationship between the imaging device and the printed product in such a manner that the shape of the quadrangle 2007 becomes coincident with the thick-line rectangle 2000 displayed on the display 106.

The additional information acquisition unit 1504 performs acquisition of additional information from the captured image. The acquisition of additional information includes some steps. First, the additional information acquisition unit 1504 performs detection of a position at which the additional information is embedded. Specifically, the additional information acquisition unit 1504 performs detection of the embedding position by analyzing a spatial frequency characteristic of image data.

In the present exemplary embodiment, two patterns such as those illustrated in FIGS. 12A and 12B are embedded in an image. In an example of embedding, subtraction of "30" is performed from the B component of RGB components. With this, the pattern illustrated in FIG. 12A and the pattern illustrated in FIG. 12B cause large power spectra to occur in two specific directions. This is apparent from FIGS. 18A and 18B. The additional information acquisition unit 1504 detects these power spectra in a local area of 8 px×8 px, thus performing data extraction of "0" or "1". Furthermore, the additional information acquisition unit 1504 is able to apply edge detection or sharpness to the local area as preprocessing for such detection, thus emphasizing the power spectra.

Next, the additional information acquisition unit 1504 performs processing for correcting deviations of coordinate positions. For example, as one method, the additional information acquisition unit 1504 repeats clipping of 8 px×8 px from within an image and frequency analysis while shifting on a pixel-by-pixel basis vertically and horizontally, performs such repetition 64 times in total corresponding to horizontal 8 px×vertical 8 px, and sets a portion in which the strongest spectra are obtained as a reference position for clipping.

Upon completion of position detection, the additional information acquisition unit 1504 performs extraction (separation) of additional information. With reference to the example illustrated in FIG. 13, to extract additional information, first, the additional information acquisition unit 1504 detects a marker portion 1301 of the unit block 1300, which is composed of a specific binary pattern, and then performs data reading from the data portion 1302 based on the position of the marker portion 1301. While, during reading, only a part may be able to be read from one block, in that case, data can be brought to perfection by compensating for data in a portion in which reading has not been able to be performed with data in another block. In other words, extraction of additional information can be performed by extracting data in a first portion within a first block and extracting data in a second portion other than the first portion within a second block different from the first block. In the example illustrated in FIG. 13, when data is completed, a numerical sequence of "0" and "1" for 800 bits is obtained.

Upon completion of separation of additional information, the additional information acquisition unit 1504 performs processing for analyzing data with respect to the numerical sequence extracted as the additional information and then converting the numerical sequence into an original form of additional information obtained before being embedded. For example, in a case where the embedded additional information is a value obtained by converting character codes included in text document data into a numerical value with "Shift JIS", during reading of additional information, the value is converted into character codes.

In a single-byte code (one-byte character) in Shift JIS, a combination of higher-order 4 bits and lower-order 4 bits is equivalent to a numerical value or a character. For example, in a case where the higher-order 4 bits are "0100" and the lower-order 4 bits are "0001", the character string is determined to be "A". In this way, a conversion map in which numerical sequences are associated with respective characters is previously retained, thus enabling conversion from a numerical sequence into a character. Specifically, a numerical sequence extracted as additional information is temporarily stored in the RAM 104 illustrated in FIG. 1. Then, the CPU 102 refers to a "Shift JIS" conversion map previously stored in the secondary storage device 105 and thus converts the temporarily stored numerical value into a character or a numeral.

For example, suppose that a numerical sequence of the additional information extracted by the additional information acquisition unit 1504 is "0110100001100101011011000110110001101111". In this case, referring to the conversion map for association produces the following results.

Higher-order 4 bits "0110" and lower-order 4 bits "1000" represent a character "h".

Higher-order 4 bits "0110" and lower-order 4 bits "0101" represent a character "e".

Higher-order 4 bits "0110" and lower-order 4 bits "1100" represent a character "l".

Higher-order 4 bits "0110" and lower-order 4 bits "1100" represent a character "l".

Higher-order 4 bits "0110" and lower-order 4 bits "1111" represent a character "o".

Accordingly, the character string "hello" is extracted. For example, the extracted character string is displayed on the display 106 by the display processing unit 401 illustrated in FIG. 4. Moreover, if the extracted character string is a Uniform Resource Locator (URL), for example, the image processing apparatus 100 accesses a web page according to the URL with use of a web browser different from the application 400 and then displays the web page on the display 106. Moreover, in a case where the URL is a video site, a moving image can be displayed on the display 106 or sound can be produced by a loudspeaker (not illustrated). Thus, reading processing for additional information is ended.

FIG. 21 is a flowchart illustrating a flow of reading of additional information. The flowchart illustrated in FIG. 21 is started based on the user having issued an instruction for the reading mode in the application 400. Furthermore, even during execution of any step illustrated in FIG. 21, if the user issues an instruction for ending the reading mode, the flowchart illustrated in FIG. 21 is ended.

In step S2101, the distance detection unit 1502 detects a distance between the internal imaging device 112 and a printed product. Next, in step S2102, the inclination detection unit 1503 detects an inclination of the internal imaging device 112 relative to the printed product (an inclination of the printed product relative to the internal imaging device 112), thus acquiring inclination information about the detected inclination. Processing in step S2101 is equivalent to the flowchart illustrated in FIG. 17. Moreover, processing in step S2102 is equivalent to detection processing for a relative inclination between the printed product and the internal imaging device described with reference to FIGS. 18A to 18C, FIGS. 19A to 19I, and FIG. 20A.

In step S2103, the display processing unit 401 displays a graphic based on the distance information acquired in step S2101 and the inclination information acquired in step S2102. This graphic is an object which changes in display form, such as size or shape, according to the distance information and the inclination information. For example, the quadrangle 2007 illustrated in FIG. 20B is a graphic (object) indicating a distance and an inclination about the printed product.

In step S2104, the additional information acquisition unit 1504 performs reading of additional information embedded in the printed product. In step S2105, the additional information acquisition unit 1504 determines whether the result of reading performed in step S2104 satisfies a predetermined criterion. Specifically, the additional information acquisition unit 1504 determines whether additional information has been successfully read. For example, the additional information acquisition unit 1504 performs the determination in step S2105 according to whether, as a result of processing performed in step S2104, additional information equivalent to the marker portion 1301 has been successfully read. Specifically, additional information equivalent to the marker portion 1301 is previously defined in the additional information acquisition unit 1504, and, if it is determined that additional information equivalent to the marker portion 1301 is included in the additional information read in step S2104, the additional information acquisition unit 1504 determines that additional information equivalent to the marker portion 1301 has been successfully read.

If, in step S2105, it is determined that the additional information has been successfully read (YES in step S2105), the application 400 advances the processing to step S2106. On the other hand, if it is determined that the additional information has not been successfully read (NO in step S2105), it is considered that a distance or an inclination which does not enable reading of additional information has been detected. Therefore, to prompt the user to adjust the distance or inclination, the application 400 returns the processing to step S2101, then re-performing detection of a distance and an inclination. Processing operations in steps S2101 to S2105 are repetitively performed a plurality of times as long as the reading mode for additional information is being executed by the application 400 and image capturing of the printed product is being performed by the internal imaging device 112. In other words, the distance and inclination about the printed product are acquired a plurality of times in steps S2101 and S2102, and, in step S2103, a graphic is displayed each time the distance and inclination about the printed product are acquired a plurality of times. Therefore, the user is enabled to recognize a distance and an inclination between the internal imaging device 112 and the printed product in real time and to attain an appropriate distance and inclination by bringing the recognized distance and inclination close to a frame indicated by the rectangle 2000 illustrated in FIGS. 20A and 20B.

In step S2106, the display processing unit 401 changes a display form of the graphic (object) to inform the user of starting of reading. Specifically, the display processing unit 401 changes the shape or color of the graphic. For example, the display processing unit 401 changes the shape and color of the graphic as in a quadrangle 2008 illustrated in FIG. 20C. In this case, changing the graphic to the same shape as that of the rectangle 2000 enables informing the user that a distance and an inclination which are appropriate for reading of additional information have been attained. Moreover, changing the color of the quadrangle enables informing the user of starting of reading in an easily understandable manner.

In step S2107, the display processing unit 401 displays a progress of reading. Specifically, the additional information acquisition unit 1504 acquires a progress status from the data amount of additional information which has been read and the data amount of additional information which is to be read. Then, the additional information acquisition unit 1504 communicates progress information generated from the acquired progress status to the display processing unit 401, so that the progress is displayed. For example, the display processing unit 401 provides a display indicating the progress status of reading such as a progress 2009 illustrated in FIG. 20C. The progress can be displayed with percentage or can be displayed with, for example, a progress bar. Furthermore, displaying the progress inside a quadrangle 2008 in the above-mentioned way enables preventing expanding of a display area and also enables the user to confirm the progress of reading without looking away from a graphic at which the user is looking. Furthermore, before step S2107, "0%" can be displayed as displaying of the progress, and, in step S2107, displaying can be performed in such a manner that the progress proceeds. In any case, in step S2107, displaying of the progress is changed.

Moreover, progress information which the additional information acquisition unit 1504 generates can be generated based on the data amounts as mentioned above, or can be generated based on the number of characters which have been read as additional information and the number of characters which are to be read as additional information. Moreover, the entire data amount of additional information which is to be read or the number of characters which are to be read as additional information can be previously defined in the application 400, or can be previously written in a portion which is to be first read in the marker portion 1301 or the data portion 1302.

In step S2108, the additional information acquisition unit 1504 determines whether all of the pieces of additional information have been read. While, when all of the pieces of additional information have been read, reading is completed, not all of the pieces of additional information may be read and there may be insufficient additional information. In that case, in step S2108, it is determined that reading is not completed (NO in step S2108), the application 400 returns the processing to step S2104, then re-performing reading processing. Additionally, if insufficient additional information has not been read during re-reading, the result of determination in step S2105 becomes NO, so that the application 400 returns the processing to step S2101. Since this case is a status which requires adjustment of a distance and an inclination, the application 400 re-performs detection of a distance and an inclination. Then, displaying of, for example, a quadrangle 2010 illustrated in FIG. 20D is performed based on the detected distance and inclination.

More specifically, if the distance or inclination between the imaging device and the printed product changes during the process of reading and a state in which additional information is not able to be read is brought about (NO in step S2105), a guide display for prompting the user to set an appropriate distance and inclination is displayed again by the processing in steps S2101 to S2103. For example, the quadrangle 2010 enters a state in which the shape thereof changes as appropriate according to the result of detection of the distance or inclination as with the quadrangle 2007. In this case, the display processing unit 401 returns the shape or color of a graphic (object) changed in step S2106 into an original state thereof. Therefore, the user can recognize that the distance or inclination about the printed product has become inappropriate and the result of reading has become not satisfying a predetermined criterion as in the determination in step S2105. Moreover, at this time, a progress 2011 of reading can be configured to continue being displayed inside the quadrangle 2010. This enables the user to recognize up to which portion of additional information which is to be read the reading has been completed.

Then, when the distance or inclination has been adjusted and reading of insufficient additional information has been able to be advanced, the graphic changes to that such as the quadrangle 2008 again (step S2106). Moreover, displaying of the progress inside the graphic is also updated (step S2107). In this case, when all of the pieces of additional information have been read, the result of the determination in step S2108 becomes YES and, then, the processing illustrated in FIG. 21 is completed, and, if there is yet insufficient additional information, the processing returns to step S2104. The above-described processing is repetitively performed a plurality of times until reading is completed.

As described above, in the present exemplary embodiment, a quadrangle is displayed based on a relative distance and inclination between the printed product and the imaging device detected by the image processing apparatus, and adjusting the shape of the quadrangle in such a way as to coincide with a target rectangle enables adjusting the distance and the inclination. With this, adjusting the shape of the quadrangle enables concurrently adjusting a distance and inclination between the printed product and the imaging device.

While, in the above-described exemplary embodiment, a UI which enables adjusting both a distance and an inclination has been described, the above-described exemplary embodiment is not limited to this, but a configuration in which only a distance is detected and a UI which enables adjusting only the distance is used can be employed. For example, a quadrangle such as those illustrated in FIGS. 20A to 20D is displayed in a size corresponding to the detected distance. Alternatively, a UI which enables adjusting only an inclination can be used, and, for example, a quadrangle such as those illustrated in FIGS. 20A to 20D is displayed in a shape corresponding to the detected inclination.

Moreover, as a UI which indicates a distance or an inclination, not only a quadrangle illustrated in FIGS. 20A to 20D but also an optional shape such as a circle can be applied. For example, in the case of a UI of the circular shape, the size of a circular object which is displayed changes according to a distance, and the shape of the circular object changes according to an inclination, so that the object is displayed as, for example, an ellipse. Then, an exactly circular frame is displayed as a display corresponding to an appropriate distance and inclination, and bringing the circular object close to the exactly circular frame enables adjusting a distance and an inclination between the imaging device and the printed product to appropriate ones.

Additionally, while, in the above-described exemplary embodiment, the size of an object changes according to a distance between the imaging device (image processing apparatus) and the printed product, the above-described exemplary embodiment is not limited to this, and the shape or color of the object can be configured to change according to the distance about the printed product. Similarly, while the shape of an object changes according to a relative inclination between the imaging device (image processing apparatus) and the printed product, the present exemplary embodiment is not limited to this, and the size or color of the object can be configured to change according to the distance.

Moreover, while, in the above-described exemplary embodiment, an example in which a targeted object (for example, a frame line) which is equivalent to an appropriate distance and inclination is displayed and the user performs adjustment by bringing an object the distance or inclination about which changes close to the targeted object has been described. However, displaying of the targeted object is not an essential constituent element. At this time, for example, before starting of the reading mode, a message indicating, for example, "please make adjustment such that the object becomes rectangular" can be displayed. Alternatively, when a targeted object is displayed before starting of the reading mode and image capturing is being performed upon starting of the reading mode, the targeted object does not need to be displayed.

While, in the above-described exemplary embodiment, a configuration in which the same additional information is repetitively embedded in each unit block on the whole plane of the printed image has been described as an example, the above-described exemplary embodiment is not limited to this. Different pieces of information can be embedded in the respective unit blocks. Alternatively, the unit blocks can be classified into a plurality of groups. In this case, the same first additional information can be embedded in each of the unit blocks of a first group, and second additional information different from the first additional information can be embedded in each of the unit blocks of a second group. The first group and the second group can be arranged in a predetermined region of the printed image in a biased manner. Alternatively, the first group and the second group can be arranged in a dispersed manner. Such groups can be three or more groups.

Moreover, while, in the above-described exemplary embodiment, a configuration in which an area in which additional information is embedded is a block of the predetermined size has been described, the above-described exemplary embodiment is not limited to this. Such an area does not need to be a rectangle such as a block, and additional information can be embedded with use of a unit area with an optional shape.

Moreover, additional information can be variable-length information, and information about an area in which additional information is embedded can be embedded in a predetermined location (for example, a leading portion) of a data portion of the unit block. For example, in the case of 800 bits, some initial bits (for example, 80 bits) can be configured to indicate a range in which additional information is embedded in the unit block.

Moreover, the application 400 can previously define a plurality of rules for a method of embedding additional information, information for discriminating a rule can be previously embedded in, for example, an initial header portion of additional information, and extraction of additional information can be performed according to the discriminated rule.

While, in the above-described exemplary embodiment, a configuration in which the image processing apparatus 100 and the printer 114 are interconnected via a network and print data generated by the image processing apparatus 100 is printed by the printer 114 has been described, the above-described exemplary embodiment is not limited to this. The printer 114 can include the application 400, and a configuration in which the printer 114 outputs a printed product with additional information embedded therein based on print data generated by the printer 114 itself. In other words, the printer 114 can additionally include a part of the function of the application 400.

Moreover, the distance detection method described in the above-described exemplary embodiment is merely an example, and a distance can be detected with use of another distance detection method. Moreover, a plurality of distance detection methods can be used in combination to detect a distance. For example, there are assumed to be a distance detection method "A" capable of accurately detecting near distances and a distance detection method "B" capable of detecting distances in the range of near distances to far distances. In this case, a manner of detection in which the distance detection method "A" is used for a range which is detectable by the distance detection method "A" and the distance detection method "B" is used for the other range can be implemented.

Additionally, the inclination detection method described in the above-described exemplary embodiment is merely an example, and an inclination can be detected with use of another inclination detection method. Moreover, a plurality of inclination detection methods can be used in combination to detect an inclination.

Moreover, while, in the above-described exemplary embodiment, image capturing of a printed product is performed by the imaging device inside the image processing apparatus 100, the above-described exemplary embodiment is not limited to this. For example, image data obtained by image capturing of a printed product performed by an imaging device outside the image processing apparatus 100 can be input to the image processing apparatus 100, and the processing described in the above-described exemplary embodiment can be performed based on the image data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-068040 filed Mar. 29, 2019, which is hereby incorporated by reference herein in its entirety.

What is claimed is:

1. An image processing method for reading additional information from image data obtained by an imaging device capturing an image of a printed product with the additional information embedded therein as an electronic watermark, the image processing method comprising:
    acquiring, a plurality of times, distance information about a distance between the imaging device and the printed product during a period the image of the printed product is being captured by the imaging device;
    causing a display to display a first object in such a manner that a size or shape of the first object changes according to pieces of distance information about the distance acquired a plurality of times;
    reading the additional information from image data obtained by the imaging device capturing the image of the printed product when the distance is a predetermined distance; and
    causing the display to display a second object exhibiting a predetermined size or shape of the first object and corresponding to the predetermined distance.

2. The image processing method according to claim 1, further comprising acquiring the distance information based on the image data.

3. The image processing method according to claim 2, further comprising acquiring the distance information by performing frequency analysis on the image data.

4. The image processing method according to claim 1, further comprising:
    acquiring inclination information about a relative inclination between the imaging device and the printed product; and
    causing the display to display the first object differing according to the distance information and differing according to the inclination information.

5. The image processing method according to claim 2, further comprising acquiring pieces of distance information about distances between respective ones of a plurality of portions of the printed product and the imaging device based on pieces of image data corresponding to the plurality of portions, and acquiring the inclination information based on the pieces of distance information.

6. The image processing method according to claim 1, further comprising causing color of the first object to change based on a result of the reading satisfying a predetermined criterion when the first object is being displayed.

7. The image processing method according to claim 6, further comprising, in a case where, in the reading performed after the predetermined criterion is satisfied, the predetermined criterion has become not satisfied, returning the color of the first object to a color thereof obtained before the predetermined criterion is satisfied.

8. The image processing method according to claim 1, further comprising causing the display to display a progress display about a progress of reading of the additional information.

9. The image processing method according to claim 8, further comprising causing the display to display the progress display inside the first object.

10. A non-transitory computer-readable storage medium storing computer-executable instructions that, when executed by a computer, cause the computer to perform an image processing method for reading additional information from image data obtained by an imaging device capturing an image of a printed product with the additional information embedded therein as an electronic watermark, the image processing method comprising:
    acquiring, a plurality of times, distance information about a distance between the imaging device and the printed product during a period in which the image of the printed product is being captured by the imaging device;
    causing a display to display a first object in such a manner that a size or shape of the first object changes according to pieces of distance information about the distance acquired a plurality of times;
    reading the additional information from image data obtained by the imaging device capturing the image of the printed product when the distance is a predetermined distance; and
    causing the display to display a second object exhibiting a predetermined size or shape of the first object and corresponding to the predetermined distance.

11. An image processing apparatus that reads additional information from image data obtained by an imaging device capturing an image of a printed product with the additional information embedded therein as an electronic watermark, the image processing apparatus comprising:
    an acquisition unit configured to acquire, a plurality of times, distance information about a distance between the imaging device and the printed product during a period in which the image of the printed product is being captured by the imaging device;
    a display processing unit configured to cause a display to display a first object in such a manner that a size or shape of the first object changes according to pieces of distance information about the distance acquired a plurality of times; and
    a reading unit configured to read the additional information from image data obtained by the imaging device capturing the image of the printed product when the distance is a predetermined distance,
    wherein the display processing unit further causes the display to display a second object exhibiting a predetermined size or shape of the first object and corresponding to the predetermined distance.

12. The image processing apparatus according to claim 11, wherein the acquisition unit acquires the distance information based on the image data.

13. The image processing apparatus according to claim 12, wherein the acquisition unit acquires the distance information by performing frequency analysis on the image data.

14. The image processing apparatus according to claim 12, wherein the acquisition unit acquires pieces of distance information about distances between respective ones of a plurality of portions of the printed product and the imaging device based on pieces of image data corresponding to the plurality of portions, and acquires the inclination information based on the pieces of distance information.

15. The image processing apparatus according to claim 11,
    wherein the acquisition unit further acquires inclination information about a relative inclination between the imaging device and the printed product; and
    wherein the display processing unit causes the display to display the first object differing according to the distance information and differing according to the inclination information.

16. The image processing apparatus according to claim 11, wherein the display processing unit further causes color of the first object to change based on a result of reading performed by the reading unit satisfying a predetermined criterion when the first object is being displayed.

17. The image processing apparatus according to claim 16, wherein, in a case where, in reading performed by the reading unit after the predetermined criterion is satisfied, the predetermined criterion has become not satisfied, the display processing unit returns the color of the first object to a color thereof obtained before the predetermined criterion is satisfied.

18. The image processing apparatus according to claim 11, wherein the display processing unit further causes the display to display a progress display about a progress of reading of the additional information performed by the reading unit.

19. The image processing apparatus according to claim 18, wherein the display processing unit causes the display to display the progress display inside the first object.

* * * * *